United States Patent
Cram

(10) Patent No.: US 9,731,861 B2
(45) Date of Patent: Aug. 15, 2017

(54) BASE ASSEMBLY WITH REINFORCING SUPPORT PANELS AND BLANKS FOR FORMING THE SAME

(71) Applicant: WestRock Shared Services, LLC, Norcross, GA (US)

(72) Inventor: Joel Cram, Ooltewah, TN (US)

(73) Assignee: WestRock Shared Services, LLC, Norcross, GA (US)

( * ) Notice: Subject to any disclaimer, the term of this patent is extended or adjusted under 35 U.S.C. 154(b) by 0 days.

(21) Appl. No.: 14/992,852

(22) Filed: Jan. 11, 2016

(65) Prior Publication Data
US 2017/0197753 A1 Jul. 13, 2017

(51) Int. Cl.
*B65D 19/44* (2006.01)
*B60P 7/06* (2006.01)

(52) U.S. Cl.
CPC .............. *B65D 19/44* (2013.01); *B60P 7/06* (2013.01); *B65D 2519/00815* (2013.01)

(58) Field of Classification Search
CPC ...... A47B 91/005; B65D 19/20; B65D 19/44; B65D 291/00019; B65D 291/00054; B65D 291/00089; B65D 291/00124; B65D 291/00935
USPC ....... 108/51.3, 53.1, 55.1, 55.3; 248/346.01; 206/320, 592, 600, 386
See application file for complete search history.

(56) References Cited

U.S. PATENT DOCUMENTS

| | | | | |
|---|---|---|---|---|
| 2,321,063 A | * | 6/1943 | Bohnke .................. | B65D 85/64 206/320 |
| 2,932,438 A | * | 4/1960 | Smith ...................... | B65D 5/12 206/320 |
| 2,936,880 A | * | 5/1960 | Kohlhaas ............. | B65D 5/5038 206/320 |
| 3,107,780 A | * | 10/1963 | Stuckert ............... | B65D 5/5038 206/320 |
| 3,837,479 A | | 9/1974 | Lehmann | |
| 4,019,672 A | | 4/1977 | Giannini | |
| 4,128,171 A | | 12/1978 | Evans | |
| 4,130,199 A | * | 12/1978 | Sorenson ............. | B65D 5/5028 206/320 |

(Continued)

FOREIGN PATENT DOCUMENTS

| | | |
|---|---|---|
| JP | H06156573 A | 6/1994 |
| JP | H0741075 A | 2/1995 |
| JP | H10236573 A | 9/1998 |

*Primary Examiner* — Jose V Chen
(74) *Attorney, Agent, or Firm* — WestRock IP Legal

(57) ABSTRACT

A base assembly for supporting an item having internal components during shipment of the item is provided. The base assembly includes a base panel and two opposing end panel assemblies. The base panel includes two opposing end members, two opposing side members, and a plurality of support panels. Each end member and side member has an inner edge and an outer edge. Each support panel extends upwardly from one of the inner edges of the end members and the side members to support the internal components of the item. The end panel assemblies extend from the outer edges of the end members. Each end panel assembly includes an end panel vertically spaced a distance from an adjacent end member and a plurality of reinforcing panels positioned between the respective end panel and the adjacent end member.

25 Claims, 15 Drawing Sheets

(56) References Cited

U.S. PATENT DOCUMENTS

| | | | | |
|---|---|---|---|---|
| 4,266,716 A | * | 5/1981 | Austin | B65D 5/3621 229/116 |
| 4,375,261 A | * | 3/1983 | Kitchell | B65D 5/5035 206/320 |
| 4,852,735 A | * | 8/1989 | Ortlieb | B65D 5/5059 108/51.3 |
| 5,016,853 A | | 5/1991 | Cox | |
| 5,473,995 A | * | 12/1995 | Gottlieb | B65D 19/38 108/51.3 |
| 6,298,989 B1 | | 10/2001 | Chu | |
| 7,014,160 B2 | | 3/2006 | Muyskens | |
| 7,648,026 B2 | * | 1/2010 | Brittain | B65D 5/5054 206/320 |
| 8,074,952 B2 | | 12/2011 | Baechle | |
| 8,505,719 B2 | | 8/2013 | Rodriguez Sanchez et al. | |
| 8,955,812 B2 | * | 2/2015 | Marrow | B65D 19/0002 108/51.3 |
| 2008/0173781 A1 | * | 7/2008 | Muyskens | B65D 81/133 248/346.01 |
| 2011/0233086 A1 | | 9/2011 | Rockwell et al. | |
| 2015/0197368 A1 | * | 7/2015 | Casey | B65D 19/38 108/51.3 |

* cited by examiner

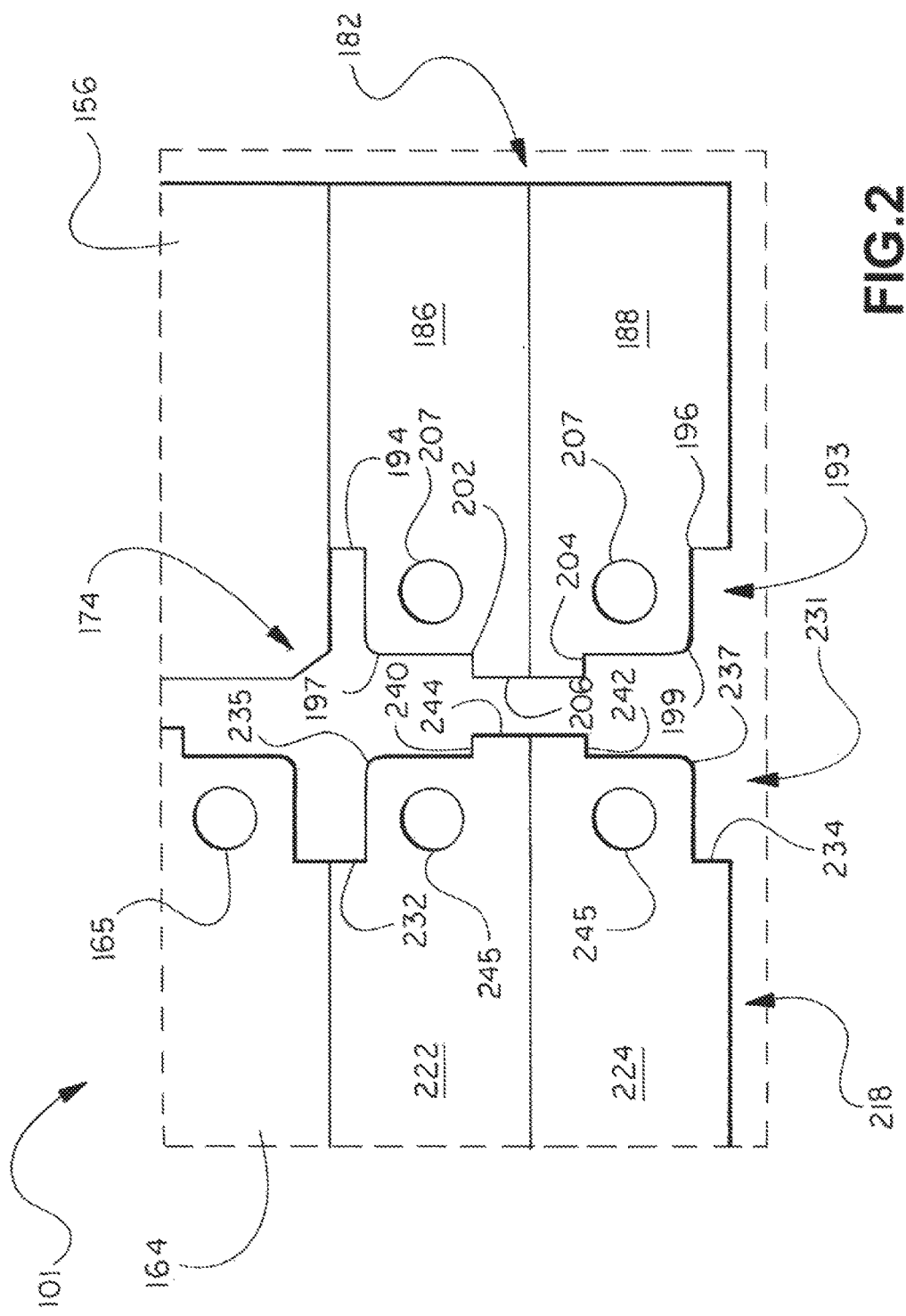

BASE ASSEMBLY WITH REINFORCING SUPPORT PANELS AND BLANKS FOR FORMING THE SAME

BACKGROUND

The field of the invention relates generally to a base assembly for supporting a product during shipment and, more particularly, to a base assembly having internal support members and reinforcing panels for supporting a product during shipment.

At least some known supporting structures, such as pallets, are used to support a base or bottom surface of objects or loads during transportation. For example, a supporting structure may be used to transport a home appliance such as a washing machine from the manufacturer to the distributor and the retailer to the customers. Vibrations and other forces exerted on the appliance may be distributed through the support structure during its transportation in an effort to prevent damage to the appliance. Some additional supporting structures (i.e., padding or protective material) may also have to be used to support and protect the appliance inside a container or other packaging during transportation.

However, some objects being shipped have internal components that extend towards the bottom of the item, but may not be fully supported during shipment. In particular, some internal components may be configured to move during the use of the object. For example, a washing machine may include a motor and a wash basket that are configured to move during use of the washing machine. During transportation of these types of items, the internal components may vibrate or move relative to the item and may cause damage to the item. In one example, movement of the wash basket of the washing machine during shipment may cause damage to springs coupled to the wash basket. The movement of the wash basket may also cause damage to an exterior housing of the washing machine due to the wash basket colliding with the exterior housing. In some cases, failure to support the wash basket of at least some washing machines during shipment of these washing machines may damage the washing machines such that it would not operate properly when it arrives for installation and use.

At least some known supporting structures may provide support for the internal components of the item during shipment of the item. These supporting structures may engage the internal components to limit movement of the internal components relative to the item during transportation. However, these known supporting structures lack sufficient reinforcement to withstand the horizontal forces (x-axis and/or y-axis forces) that are oftentimes exerted on the item being shipped. This may result in the shipped item being seriously damaged. For example, a fork truck or similar vehicle may be used to transfer the item from a shipping truck to a warehouse. These fork trucks typically exert a great deal of side forces on the item (i.e., appliance) when they grab and lift the item along with the supporting structure. In these cases, these known supporting structures are unable to withstand these forces, and thus, these known supporting structures will bend, crush, or otherwise deform. As a result of the supporting structure being unable to carry these forces, the item being shipped may also be damaged from these forces being applied.

Accordingly, it is desirable to provide a base assembly that supports an object during shipment of the object including support for certain internal components that may not be fully supported by the object itself because said components are moveable within the object and reinforcement to withstand horizontal forces applied to the base assembly during shipment.

BRIEF DESCRIPTION

In one aspect, a base assembly for supporting an item having internal components during shipment of the item is provided. The base assembly includes a base panel and two opposing end panel assemblies. The base panel includes two opposing end members, two opposing side members, and a plurality of support panels. Each end member and side member has an inner edge and an outer edge. Each support panel extends upwardly from one of the inner edges of the end members and the side members to support the internal components of the item. The end panel assemblies extend from the outer edges of the end members. Each end panel assembly includes an end panel vertically spaced a distance from an adjacent end member and a plurality of reinforcing panels positioned between the respective end panel and the adjacent end member.

In another aspect, a blank of sheet material for forming a base assembly for supporting an item having internal components during shipment of the item is provided. The blank includes a base panel and two opposing end panel assemblies. The base panel includes two opposing end members, two opposing side members, and a plurality of support panels. Each end member and side member has an inner edge and an outer edge. Each support panel extends upwardly from one of the inner edges of the end members and the side members to support the internal components of the item when the base assembly is formed. The end panel assemblies extend from the outer edges of the end members. Each end panel assembly includes an end panel and a plurality of reinforcing panels. Each end panel is vertically spaced a distance from an adjacent end member and the plurality of reinforcing panels are positioned between the respective end panel and the adjacent end member when the base assembly is formed.

In yet another aspect, a method for forming a base assembly for supporting an item having internal components during shipment of the item from a blank is provided. The blank includes a base panel and two opposing end panel assemblies extending from the base panel. The base panel includes two opposing end members, two opposing side members, and a plurality of support panels. Each end member and side member has an inner edge and an outer edge. Each end panel assembly includes an end panel and a plurality of reinforcing panels. The method folding the plurality of reinforcing panels of the two end panel assemblies inwardly towards a bottom surface of an adjacent end member of the two opposing end members using accordion style folds to form a vertical stack, folding the end panels of the two end panel assemblies inwardly towards a bottom surface of the adjacent end member, and extending the plurality of support panels upwardly from one of the inner edges of the end members and the side members to support at least one of the internal components of the item being shipped. Each end panel is vertically spaced a distance from the adjacent end member and the vertical stack is positioned between the end panel and the adjacent end member.

BRIEF DESCRIPTION OF THE DRAWINGS

FIGS. 1-14 show exemplary embodiments of the assembly and methods described herein.

FIG. 1 is a top plan view of an exemplary blank of sheet material for forming a base assembly in accordance with one embodiment of the present disclosure.

FIG. 2 is a top plan view of a portion of an exemplary blank sheet of material for forming the base assembly shown in FIG. 1.

FIG. 3 is a top plan view of an exemplary blank of sheet material for forming a secondary support assembly on the base assembly shown in FIG. 1.

FIG. 4 is a top plan view of an exemplary blank of sheet material for forming a secondary support assembly on the base assembly shown in FIG. 1.

FIG. 5 is a top plan view of an exemplary blank of sheet material for forming a secondary support assembly on the base assembly shown in FIG. 1.

FIG. 6 is a top plan view of an exemplary blank of sheet material for forming a secondary support assembly on the base assembly shown in FIG. 1.

FIG. 7 is a top plan view of an exemplary blank of sheet material for forming a secondary support assembly on the base assembly shown in FIG. 1.

FIG. 8 is a top plan view of an exemplary blank of sheet material for forming a secondary support assembly on the base assembly shown in FIG. 1.

FIG. 9 is a perspective view of an exemplary base assembly partially formed from the blank shown in FIG. 1 during folding of a stack of reinforcing panels.

FIG. 10 is a perspective view of the exemplary base assembly shown in FIG. 9 during folding of another stack of reinforcing panels.

FIG. 11 is a perspective view of the exemplary base assembly shown in FIG. 9 during folding of an end panel.

FIG. 12 is a perspective view of the exemplary base assembly shown in FIG. 9 with a support structure in a shipping configuration.

FIG. 13 is a perspective view of the exemplary base assembly shown in FIG. 9 with an exemplary secondary support assembly.

FIG. 14 is a perspective view of the exemplary base assembly shown in FIG. 9 with another exemplary secondary support assembly.

DETAILED DESCRIPTION

Figure 1A:
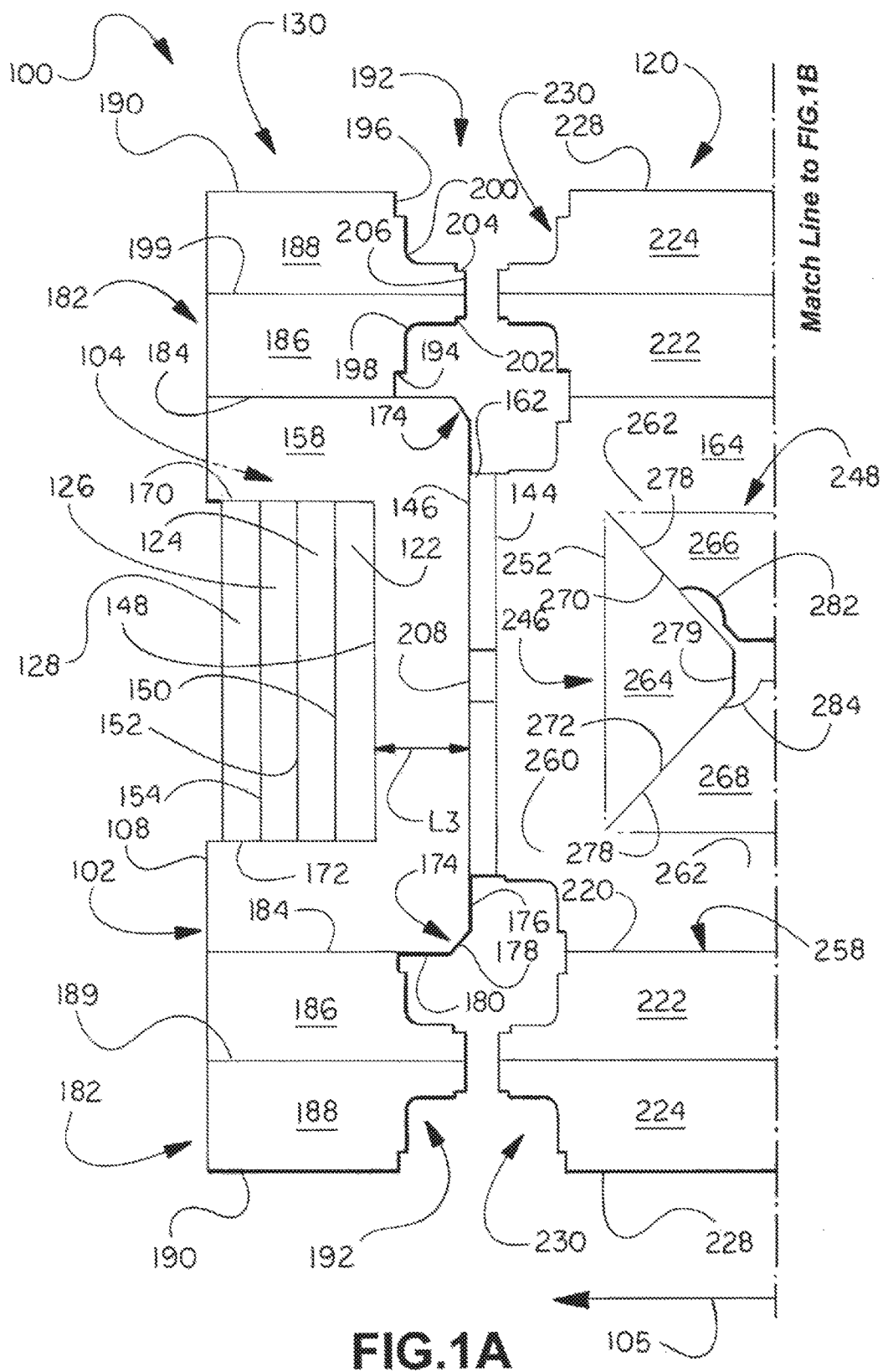

The following detailed description illustrates the disclosure by way of example and not by way of limitation. The description clearly enables one skilled in the art to make and use the disclosure, describes several embodiments, adaptations, variations, alternative, and user of the disclosure, including what is presently believed to be the best mode of carrying out the disclosure.

The present disclosure provides a base assembly that includes alternating reinforcing panels and an upwardly extending support structure for supporting components of an item being shipped on the base assembly, and a method for constructing the base assembly. The base assembly is constructed from a blank of sheet material. In the example embodiments, the base assembly is at least partially formed using a machine. For example, the base assembly can be folded (by hand or by a machine) and the upwardly extending support structure can be formed using a mandrel extending through the interior of the support structure. In one embodiment, the base assembly is fabricated from a paperboard material. The base assembly, however, may be fabricated using any suitable material, and therefore is not limited to a specific type of material. In alternative embodiments, the base assembly is fabricated using cardboard, plastic, fiberboard, paperboard, foamboard, corrugated paper, and/or any suitable material know to those skilled in the art and guided by the teachings herein provided.

In the example embodiment, the base assembly includes a plurality of reinforcing panels that are folded or rotated in an alternating configuration to form a vertical stack of reinforcing panels. The stack of reinforcing panels is configured to provide additional support to the surfaces of the base assembly by distributing forces applied to the upper surface of the base assembly by the weight of the item being shipped to the outer members of the base assembly. In addition, the base assembly includes a support structure that is adjustable from a flat configuration to a shipping configuration. In the shipping configuration, the support structure extends upwardly towards one or more internal components of an object or item positioned on the base assembly. The base assembly may also include a secondary support (or outer) member coupled to the support structure (or inner support structure) to form a support assembly. The support assembly is configured to engage and secure the internal components to inhibit movement of the internal components relative to the item or object being shipped.

In at least some embodiments, the item being shipped and the base assembly are positioned within a container during shipment. Additionally or alternatively, the item may be packaged within a container before being placed on the base assembly.

In one embodiment, the base assembly and/or a blank includes at least one marking thereon including, without limitation, indicia that communicates the product, a manufacturer of the product and/or a seller of the product. For example, the marking may include printed text that indicates a product's name and briefly describes the product, logos and/or trademarks that indicate a manufacturer and/or seller of the product, and/or designs and/or ornamentation that attract attention. In another embodiment, the container is void of markings, such as, without limitation, indicia that communicates the product, a manufacturer of the product and/or a seller of the product. Furthermore, the container may have any suitable size, shape and/or configuration, i.e., any suitable number of sides having any suitable size, shape and/or configuration as described and/or illustrated herein. In particular embodiments, the base assembly includes a shape that provides functionality, such as a shape that facilitates packaging an item with moveable internal components, a shape that facilitates transporting the base assembly, and/or a shape that facilitates stacking and/or arrangement of a plurality of containers.

Further, different embodiments described here can vary in size and/or dimensions although similar labels are used for each embodiment. For example, although a depth is labeled similarly throughout the description, each embodiment can have varying depths.

Figure 1B:
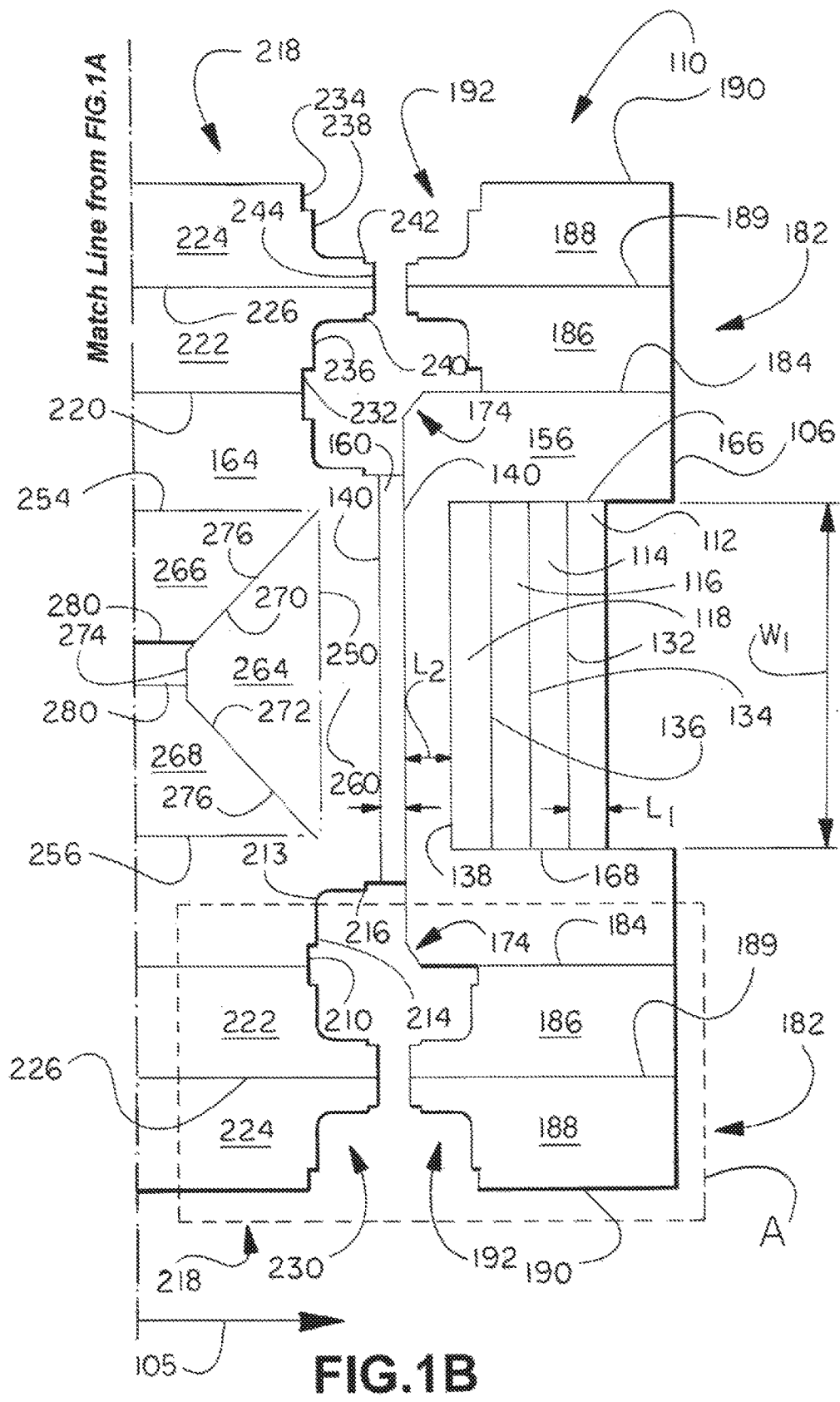

Turning now to the FIGS., FIG. 1 is a top plan view of an exemplary blank 100 of sheet material for forming a base assembly 1000 (shown in FIGS. 9-14). Blank 100 has a first or top surface 102 and an opposing second or bottom surface 104. Although described as top and bottom surfaces 102, 104, it should be noted that when base assembly 1000 is formed, at least some of the panels are rotated 180° such that the top surface of these panels may become the bottom surface of the base assembly (and vice versa) when base assembly 1000 is formed. Further, blank 100 defines a leading edge 106 and an opposing trailing edge 108. In one embodiment, blank 100 includes, from leading edge 106 to trailing edge 108, a first end panel assembly 110, a plurality of first reinforcing panels 112, 114, 116, 118, a base panel assembly 120, a plurality of second reinforcing panels 122, 124, 126, 128, and a second end panel assembly 130 coupled together along preformed, generally parallel, fold lines 132, 134, 136, 138, 140, 142, 144, 146, 148, 150, 152, and 154 as described herein. First and second end panels assemblies 110, 130 include an end panel 156, 158 and a fold panel 160, 162, respectively. Base panel assembly 120 includes a base panel 164.

In the exemplary embodiment, first reinforcing panels 112, 114, 116, 118, and first fold panel 160 are substantially congruent with second reinforcing panels 122, 124, 126, 128, and second fold panel 162, respectively; however, it should be understood that first reinforcing panels 112, 114, 116, 118, first fold panel 160, second fold panel 162, and/or second reinforcing panels 122, 124, 126, 128 can each have any suitable size, shape, and/or configuration that enables blank 100 and/or base assembly 1000 to function as described herein.

First and second reinforcing panels 112, 114, 116, 118, 126, 128, 130, 132 each have a length $L_1$ and a width $W_1$. First reinforcing panels 112, 114, 116, 118 are coupled to each other along fold lines 132, 134, 136. In particular, reinforcing panel 112 extends from reinforcing panel 114 along fold line 132, reinforcing panel 114 extends from reinforcing panel 116 along fold line 134, and reinforcing panel 116 extends from reinforcing panel 118 along fold line 136. Reinforcing panel 118 extends from first end panel 156 along fold line 138. First reinforcing panels 112, 114, 116, 118 are positioned between a first edge 166 and a second edge 168 of first end panel 156. In the exemplary embodiment, first reinforcing panels 112, 114, 116, 118 are not coupled to first edge 166 and second edge 168 to facilitate rotation about fold lines 132, 134, 136, and 138. In other embodiments, one or more of first reinforcing panels 112, 114, 116, 118 may be coupled to first edge 166 and/or second edge 168.

Similarly, second reinforcing panels 122, 124, 126, 128 are coupled to each other along fold lines 150, 152, 154. In particular, reinforcing panel 124 extends from reinforcing panel 122 along fold line 150, reinforcing panel 126 extends from reinforcing panel 124 along fold line 152, and reinforcing panel 128 extends from reinforcing panel 126 along fold line 154. Reinforcing panel 122 extends from second end panel 158 along fold line 148. Second reinforcing panels 122, 124, 126, 128 are positioned between a first edge 170 and a second edge 172 of second end panel 158. In the exemplary embodiment, second reinforcing panels 122, 124, 126, 128 are not coupled to first edge 170 and second edge 172 to facilitate rotation about fold lines 148, 150, 152, and 154. In other embodiments, one or more of second reinforcing panels 122, 124, 126, 128 may be coupled to first edge 170 and/or second edge 172.

First end panel 156 extends from first fold panel 160 along fold line 140 to leading edge 106, first fold panel 160 extends to base panel 164 along fold line 142, base panel 164 extends to second fold panel 126 along fold line 144, and second fold panel 126 extends to second end panel 158 along fold line 146. Fold lines 132, 134, 136, 138, 140, 142, 144, 146, 148, 150, 152, and/or 154 as well as other fold lines and/or hinge lines described herein may include any suitable line of weakening and/or line of separation known to those skilled in the art and guided by the teachings herein provided. It should be understood that, although not shown, blank 100 may include vent holes, cutouts, tabs, and/or any other additional features therein. In the illustrated embodiment, blank 100 includes a plurality of corrugated flutes oriented parallel to corrugation direction 105.

First and second end panels 156, 158 further include two opposing corner pad sections 174. Each corner pad section 174 includes a first side edge 176, a corner edge 178, and a second side edge 180. As described herein, corner pad sections 174 extend beyond base panel assembly 120 when base assembly 1000 is formed and, in some embodiments, are configured to receive a portion of the item being shipped such as a leg or frame.

In the illustrated embodiment, first and second end panel assemblies 110, 130 further include two opposing outer side panel assemblies 182 connected to first end panel 156 and second end panel 158, respectively. In some embodiments, each outer side panel assembly 182 may be a different size, shape, or configuration in comparison to the other outer side panel assemblies 182. Outer side panel assemblies 182 extend from first and second end panels 156, 158 along a fold line 184. In one embodiment, outer side panel assemblies 182 are rotatable inwardly towards first end panel 156 and second end panel 158. In the exemplary embodiment, outer side panel assemblies 182 include a first outer side panel 186 and a second outer side panel 188. First outer side panel 186 is coupled between second outer side panel 188 and first end panel 156 or second end panel 158. Second outer side panel 188 extends from first outer side panel 186 along a fold line 189.

Outer side panel assembly 182 further includes leading edge 106 or trailing edge 108, a side edge 190, and a neck portion 192. Neck portion 192 has a pair of opposed first offsets 194, 196. Offset 194 extends to fold line 184. Offset 196 extends to side edge 190. Offsets 194, 196 further extend to a pair of opposed corner edges 198, 200 of neck portion 192. In the illustrated embodiment, neck portion 192 further includes a pair of second offsets 202, 204 coupled to corner edges 198, 200 and an outer edge 206 that extends between offsets 202, 204. Although outer side panel assemblies 182 are described having neck portion 192, it is to be understood that outer side panel assemblies 182 may include a different configuration to function as described herein.

In the exemplary embodiment, first end panel 156 has a length $L_2$ less than a length $L_3$ of second end panel 158. When base assembly 1000 is formed, second end panel 158, reinforcing panels 122, 124, 126, 128, and second fold panel 162 define a cavity (not shown). Second fold panel 162 includes a cutout 208 to facilitate gripping base assembly 1000 during manufacture and transportation.

In the exemplary embodiment, base panel 164 includes a straight edge 210, a corner edge 212, a first offset 214 between straight edge 210 and corner edge 212 and a second offset 216 for each corner. In other embodiments, base panel 164 includes a different configuration in each corner, such as only corner edge 212.

Base panel assembly 120 further includes a pair of opposed central side panel assemblies 218 connected to base panel 164. In some embodiments, central side panel assemblies 218 have a different size, shape, and/or configuration in comparison to each other. Central side panel assemblies 218 extend from base panel 164 along a fold line 220 and are rotatable inwardly toward base panel 164. In the exemplary embodiment, central side panel assemblies 218 include a first central side panel 222 and a second central side panel 224. First central side panel 222 extends between base panel 164 and second central side panel 224. Second central side panel 224 extends from first central side panel 222 along a fold line 226 and is rotatable inwardly towards first central side panel 222. Central side panel assemblies 218 further include a side edge 228 and a pair of opposing neck portions 230. In the exemplary embodiment, neck portions 230 are substantially similar to neck portion 192 of outer side panel assemblies 182. More specifically, neck portion 230 has a pair of first offsets 232, 234, a pair of corner edges 236, 238, a pair of second offsets 240, 242, and an outer edge 244. Offset 230 extends between straight edge 210 of base panel 164 and corner edge 236. Offset 232 extends between corner edge 238 and side edge 228. Offsets 240, 242 extend between corner edges 236, 238 and outer edge 244, respectively.

FIG. 2 is a top plan view of an alternative portion 101 that may be used with blank 100 (shown in FIG. 1). Portion 101 corresponds to a portion of blank 100 indicated generally as portion A shown in FIG. 1. Portion 101 is similar to portion A and, in the absence of contrary representation, includes similar functionality. The same reference numbers from portion A are used for corresponding components. Although only portion 101 is shown, it is to be understood that each corner of blank 100 may be similar to portion 101

In the exemplary embodiment, portion 101 includes end panel 156, base panel 164, corner pad section 174, outer side panel assembly 182, and central side panel assembly 218. Outer side panel 182 includes a neck portion 193. Neck portion 193 is similar to neck portion 192 shown in FIG. 1. In the exemplary embodiment, neck portion 193 includes first offsets 194, 196, a pair of opposing corner edges 197, 199, second offsets 202, 204, and an outer edge 206. Corner edges 197, 199 extend between first offsets 194, 196 and second offsets 202, 204, respectively. In addition, neck portion 193 includes a pair of opposing holes 207. In the exemplary embodiment, when second outer side panel 188 is folded over first outer side panel 186, holes 207 are substantially aligned with each other.

Central side panel assembly 218 includes a neck portion 231. Neck portion 231 is similar to neck portion 230 shown in FIG. 1. In the exemplary embodiment, neck portion 231 includes first offsets 232, 234, a pair of opposing corner edges 235, 237, second offsets 240, 242, and outer edge 244. Corner edges 235, 237 extend between first offsets 232, 234 and second offsets 240, 242, respectively. Neck portion 231 further includes a pair of opposing holes 245. In the exemplary embodiment, when second central side panel 224 is folded over first central side panel 222, holes 245 are substantially aligned with each other.

Base panel 164 also includes a hole 165 in each corner. When base assembly 1000 is formed, holes 165, 207, and 245 are substantially aligned and extend downwardly from base panel 164 to end panel 156 and corner pad section 174. Holes 165, 207, 245 are configured to receive a portion of the item being shipped, such as a leg or a frame. Holes 165, 207, 245 provide additional support for the item during shipment by securing and stabilizing the item. In some embodiments, portion 101 may include a different number, size, shape, and/or configuration of holes 165, 207, and/or 245 to facilitate additional support for the item. For example, portion 101 may not include holes 207. That is, the leg or frame of the item extends through holes 165 and 245 to outer side panel assembly 182 rather than to end panel 156.

With reference again to FIG. 1, in the exemplary embodiment, base panel 164 is connected to a support structure 246 (or support structure assembly). Support structure 246 is configured to support one or more internal components when base assembly 1000 is formed. Support structure 246 is formed within base panel 164 to extend to the internal components as described herein. In the exemplary embodiment, support structure 246 extends inwardly from base panel 164. More particularly, support structure 246 extends inwardly from an interior edge 248 of base panel 164. Inner edge 248 is defined by a plurality of fold lines 250, 252, 254, and 256. Base panel 164 also includes an outer edge 258 defined by fold lines 142, 144, and 218. Base panel 164 may be segmented into two opposing end members 260 and two opposing side members 262 that extend between inner edge 248 and outer edge 258 by support structure 246.

Support structure 246 may include any suitable shape or design to function as described herein. In the exemplary embodiment, support structure 246 includes a pair of end support panels 264 and a pair of side support panels 266, 268 (collectively referred to as "support panels"). End support panels 264 and side support panels 266, 268 are rotatable about fold lines 250, 252, 254, and 256, respectively. In the exemplary embodiment, end support panels 264 and side support panels 266, 268 are rotatable upwards and outwardly from base panel 164.

End support panels 264 each include a pair of angled edges 270, 272 and an interior edge 274. Although end support panels 264 are illustrated with similar configurations, it is to be understood that end support panels 264 may have a different size, shape, and/or configuration in other embodiments. Side support panels 264 and 266 each include angled edges 276, 278 and an interior edge 280. Angled edge 278 of side support panel 266 includes a first cutout 282 and angled edge 278 of side support panel 268 includes a second cutout 284 to facilitate forming base assembly 1000 and/or to support an internal component of an item positioned on base assembly 1000.

Support structure 246 is shown in FIG. 1 in a flat configuration. Angled edges 270, 272 of end support panels 264 are substantially adjacent to angled edges 276, 278 of side support panels 266, 268 in the flat configuration. In other embodiments, angled edges 270, 272 of end support panels 264 may overlap angled edges 276, 278 of side support panels 266, 268 in the flat configuration. Support structure 246 is selectively adjustable or rotatable to a shipping configuration (shown in FIG. 12). In the exemplary embodiment, support structure 246 is configured to couple to one or more secondary support assemblies (not shown in FIG. 1) to support one or more internal components of an item positioned on base assembly 1000 and to bias support structure 246 in the shipping configuration. In certain embodiments, base assembly 1000 may not include a secondary support assembly. That is, support structure 246 may engage the internal components of the object being shipped without the secondary support assembly.

Although only one shipping configuration is described, it is to be understood that end support panels 264 and side support panels 266, 268 are rotatable to a plurality of configurations. Additionally or alternatively, the lengths and widths of end support panels 264 and/or side support panels 266, 268 may be adjusted during fabrication for specific shipping configurations.

FIGS. 3-8 illustrate exemplary blanks of secondary support assemblies that may be used with blank 100 shown in FIG. 1 to form base assembly 1000. In particular, the secondary support assemblies are coupled to support structure 246 of blank 100 when support structure 246 is in the shipping configuration. The secondary support assemblies may be coupled to support structure 246 with an adhesive, fasteners, and the like. In other embodiments, blank 100 and/or the secondary support assemblies may include features such as tabs and slots to couple the secondary support assemblies to support structure 246. The blanks of the secondary support assemblies are typically angled to facilitate coupling the secondary support assemblies around a portion of support structure 246 as described herein.

Figure 3:
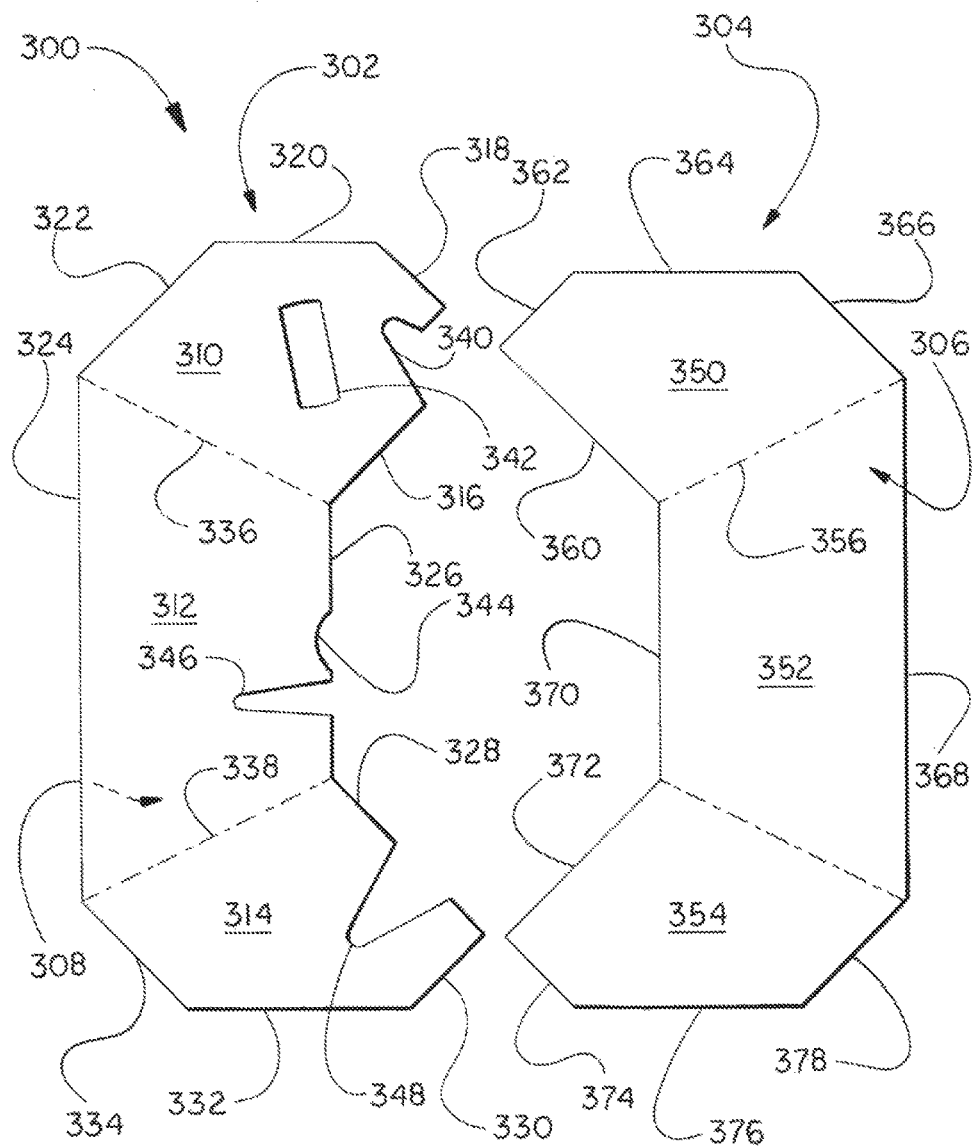

FIG. 3 is a top plan view of an exemplary blank 300 of a secondary support assembly. Blank 300 includes two separate members 302 and 304 that couple to a support structure. As used herein, members 302 and 304 may also be considered separate secondary support assemblies. Blank 300 has a first surface 306 and a second surface 308 opposite first surface 306. In the exemplary embodiment, second surface 308 is engaged in face-to-face relationship with the support structure when base assembly 1000 is formed.

First member 302 has a first side panel 310, an interior panel 312, and a second side panel 314. First side panel 310 has an interior edge 316, a side edge 318, a corner edge 320, and a bottom edge 322. Interior panel 312 has a bottom edge 324 and an interior edge 326. Second side panel 314 has an interior edge 328, a side edge 330, a corner edge 332, and a bottom edge 334. First side panel 310 and second side panel 314 extend from interior panel 312 along fold lines 336 and 338, respectively. In the exemplary embodiment, first side panel 310 and second side panel 314 are rotated about fold lines 336, 338 towards second surface 308 to engage the support structure.

In at least some embodiments, first member 302 and/or second member 304 may include one or more cutouts, grooves, holes, and the like to facilitate forming base assembly 1000 and supporting one or more internal components of an item positioned on base assembly 1000. For example, first member 302 includes five cutouts 340, 342, 344, 346, and 348. Each cutout 340, 342, 344, 346, and 348 has a different shape, size, and configuration. In other embodiments, blank 300 may include a different number, shape, size, and/or configuration of cutouts.

Side edge 318 of first side panel 310 extends from corner edge 320 through cutout 340 to interior edge 316. Interior edge 316 of first side panel 310 meets interior edge 326 of interior panel 312 at fold line 336. Interior edge 326 extends through cutouts 344 and 346 to interior edge 328 of second side panel 314. Side edge 330 extends between interior edge 328 and corner edge 332. Bottom edge 334 of second side panel 314 is formed between corner edge 332 and bottom edge 324 of interior panel 312. Bottom edge 324 extends towards bottom edge 322 and corner edge 320 of first side panel 310.

Second member 304 is generally similar to first member 302 except without cutouts 340, 342, 344, 346, 348. In the exemplary embodiment, second member 304 has a first side panel 350, an interior panel 352, and a second side panel 354. First and second side panels 350, 354 are coupled to interior panel 352 along fold lines 356 and 358, respectively. First and second side panels 350, 354 are rotatable about fold lines 356, 358 towards second surface 308. In other embodiments, first and second side panels 350, 354 are rotatable about fold lines 356, 358 in a different direction of rotation. First side panel 350 has an interior edge 360, a side edge 362, a corner edge 364, and a bottom edge 366. Interior panel 352 has a bottom edge 368 and an interior edge 370. Second side panel 354 has an interior edge 372, a side edge 374, a corner edge 376, and a bottom edge 378.

Figure 4:
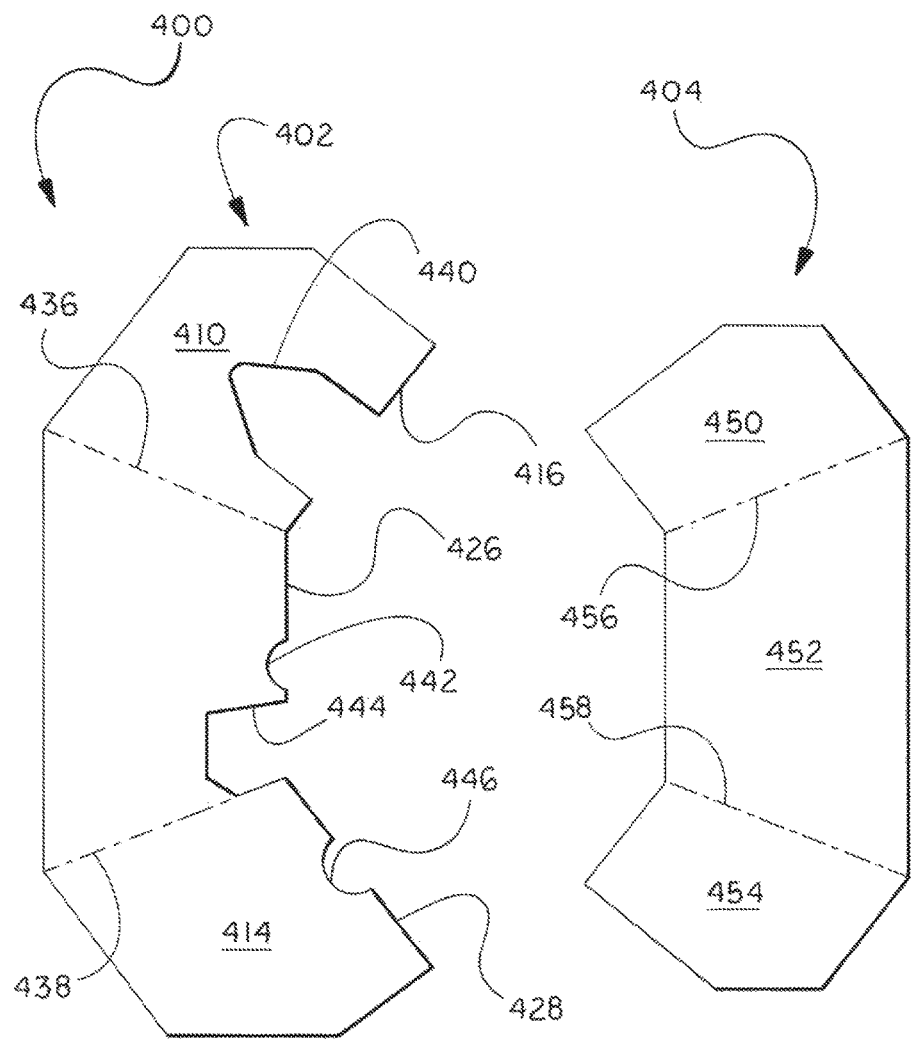

FIG. 4 is a top plan view of another exemplary blank 400 of secondary member. Similar to blank 300 (shown in FIG. 3), blank 400 includes a first member 402 and a second member 404. First member 402 has a first side panel 410, an interior panel 412, and a second side panel 414. First and second side panels 410, 414 extend from interior panel 412. First and second side panels 410, 414 are rotatable about fold lines 436 and 438, respectively. Second member 404 has a first side panel 450, an interior panel 452, and a second side panel 454. First and second side panels 450, 454 extend from interior panel 452. First and second side panels 450, 454 are rotatable about fold lines 456 and 458, respectively.

Blank 400 includes a different configuration of cutouts in comparison to blank 300. In the exemplary embodiment, first member 402 includes a cutout 440 on an interior edge 416 of first side panel 410, two cutouts 442 and 444 on an interior edge 426 of interior panel 412, and a cutout 446 on an interior edge 428 of second side panel 414. Cutouts 440, 442, 444, and 446 may be formed for specific product or item to be packaged on base assembly 1000.

Figure 5:
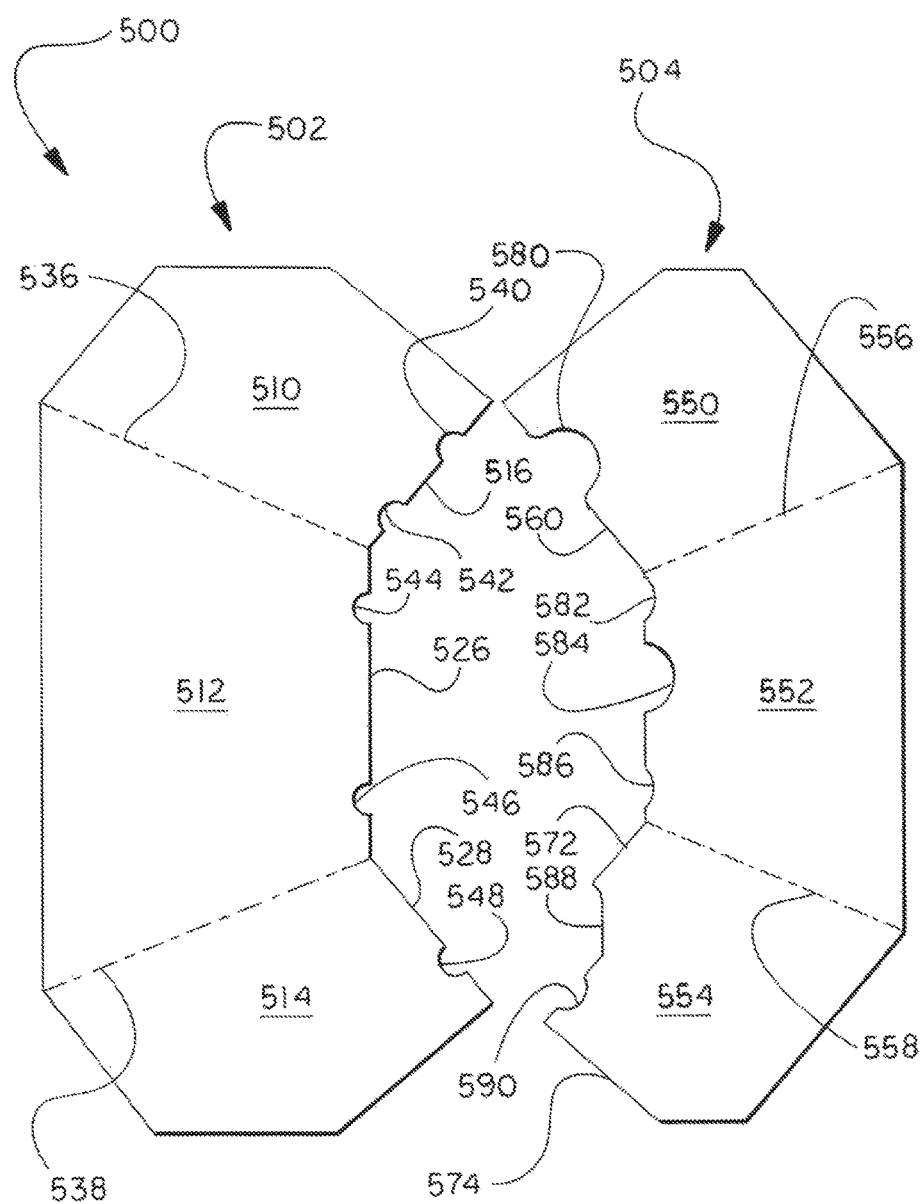

FIG. 5 is a top plan view of another exemplary blank 500 of secondary member. Similar to blanks 300 and 400, blank 500 includes a first member 502 and a second member 504. First member 502 has a first side panel 510, an interior panel 512, and a second side panel 514. First and second side panels 510, 514 extend from interior panel 512. First and second side panels 510, 514 are rotatable about fold lines 536 and 538, respectively. Second member 504 has a first side panel 550, an interior panel 552, and a second side panel 554. First and second side panels 550, 554 extend from interior panel 552. First and second side panels 550, 554 are rotatable about fold lines 556 and 558, respectively.

Blank 500 includes a different configuration of cutouts in comparison to blanks 400 and 500. In the exemplary embodiment, first member 502 includes two cutouts 540 and 542 on an interior edge 516 of first side panel 510, two cutouts 544 and 546 on an interior edge 526 of interior panel 512, and a cutout 548 on an interior edge 528 of second side panel 514. In the exemplary embodiment, cutouts 540, 542, 544, 546, and 548 have a similar shape and size. In other embodiments, cutouts 540, 542, 544, 546, and/or 548 may have a different shape and/or size. Cutouts 540, 542, 544, 546, and 548 may be formed for specific product or item to be packaged on base assembly 1000.

In the illustrated embodiment, second member 504 includes a plurality of cutouts along interior edges 560, 570, and 572 of first side panel 550, interior panel 552, and second side panel 554, respectively. In particular, first side panel 550 has a cutout 580 along interior edge 560. Interior panel 552 has three cutouts 582, 584, and 586 spaced apart along interior edge 570. Second side panel 554 has a pair of cutouts 588 and 590 on interior edge 572. Cutout 588 extends from interior edge 572 to a side edge 574 of second side panel 554. Cutout 590 is formed within cutout 588.

Figure 6:
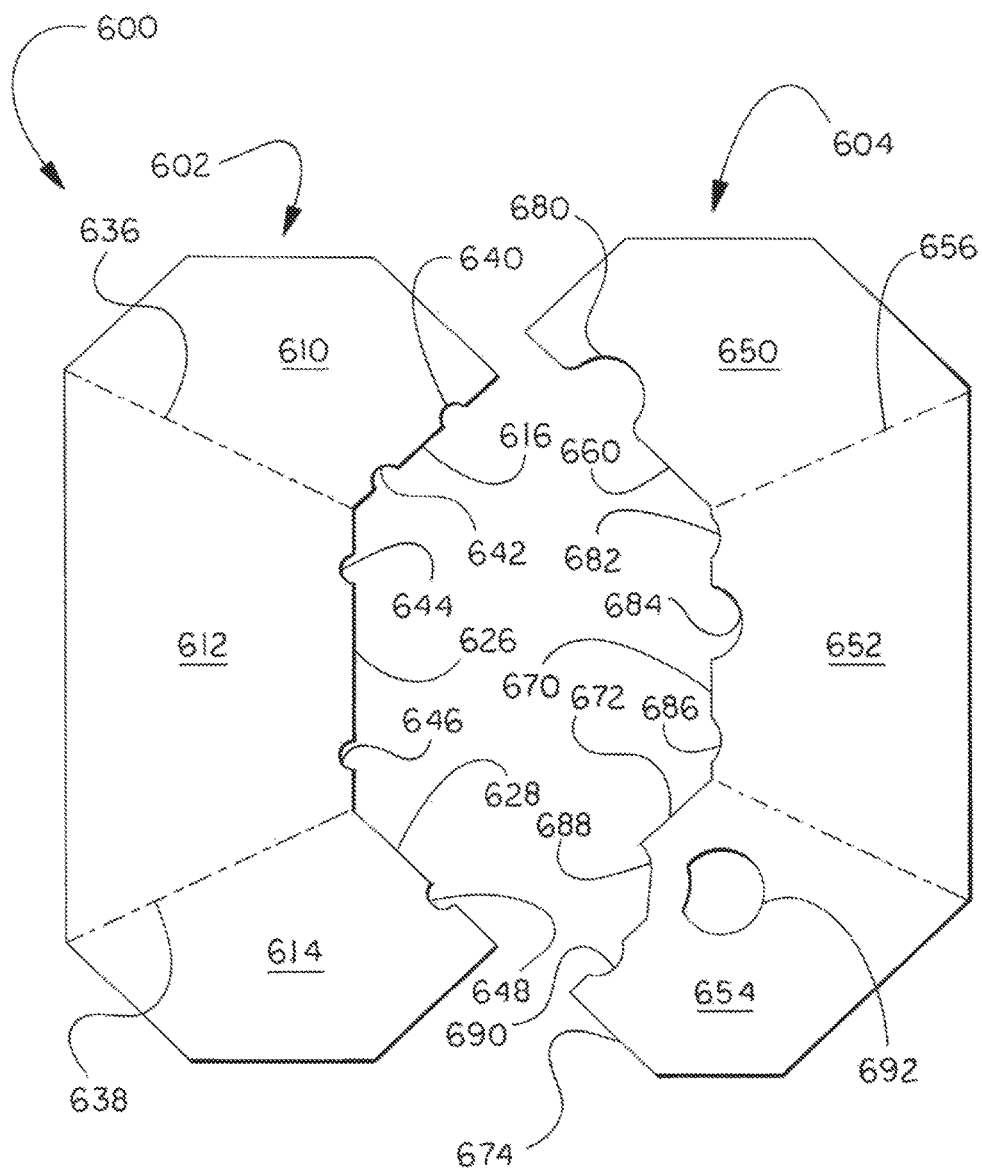

FIG. 6 is a top plan view of another exemplary blank 600 of secondary member. Similar to blank 500, blank 600 includes a first member 602 and a second member 604. First member 602 has a first side panel 610, an interior panel 612, and a second side panel 614. First and second side panels 610, 614 extend from interior panel 612. First and second side panels 610, 614 are rotatable about fold lines 636 and 638, respectively. Second member 604 has a first side panel 650, an interior panel 652, and a second side panel 654. First and second side panels 650, 654 extend from interior panel 652. First and second side panels 650, 654 are rotatable about fold lines 656 and 658, respectively.

First member 602 has a configuration similar to first member 602 of blank 500. In the exemplary embodiment, first member 602 includes two cutouts 640 and 642 on an interior edge 616 of first side panel 610, two cutouts 644 and 646 on an interior edge 626 of interior panel 612, and a cutout 648 on an interior edge 628 of second side panel 614. In the exemplary embodiment, cutouts 640, 642, 644, 646, and 648 have a similar shape and size. In other embodiments, cutouts 640, 642, 644, 646, and/or 648 may have a different shape and/or size.

Second member 604 has a configuration similar to second member 604 of blank 500. In the illustrated embodiment, second member 604 includes a plurality of cutouts along interior edges 660, 670, and 672 of first side panel 650, interior panel 652, and second side panel 654, respectively. In particular, first side panel 650 has a cutout 680 along interior edge 660. Interior panel 652 has three cutouts 682, 684, and 686 spaced apart along interior edge 670. Second side panel 654 has a pair of cutouts 688 and 690 on interior edge 672. Cutout 688 extends from interior edge 672 to a side edge 674 of second side panel 654. Cutout 690 is formed within cutout 688. Unlike second member 604, second member 604 of blank 600 includes an interior cutout 692 on second side panel 654. In the illustrated embodiment, interior cutout 692 is a semi-circular hole within second side panel 654.

Figure 7:
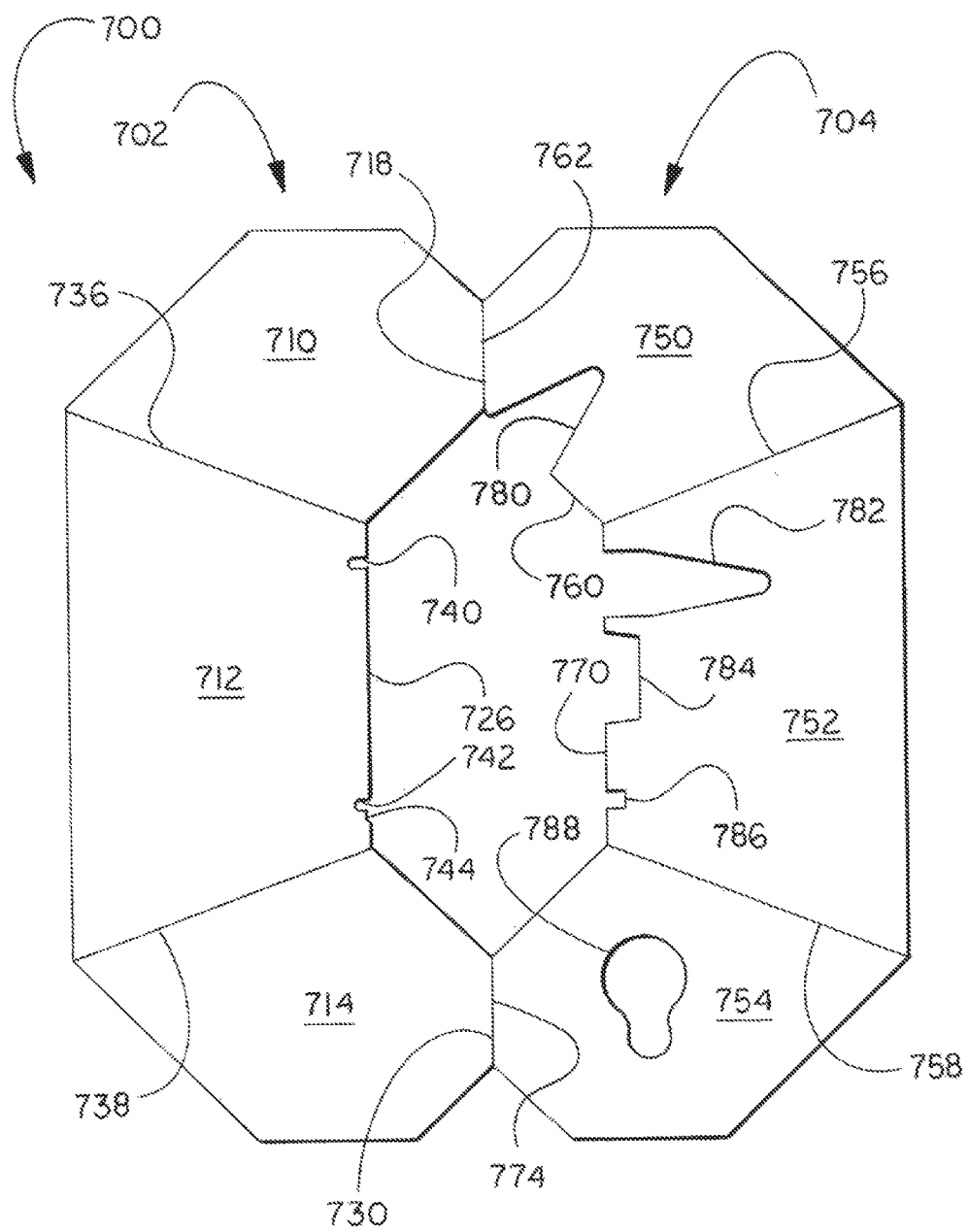
Figure 8:
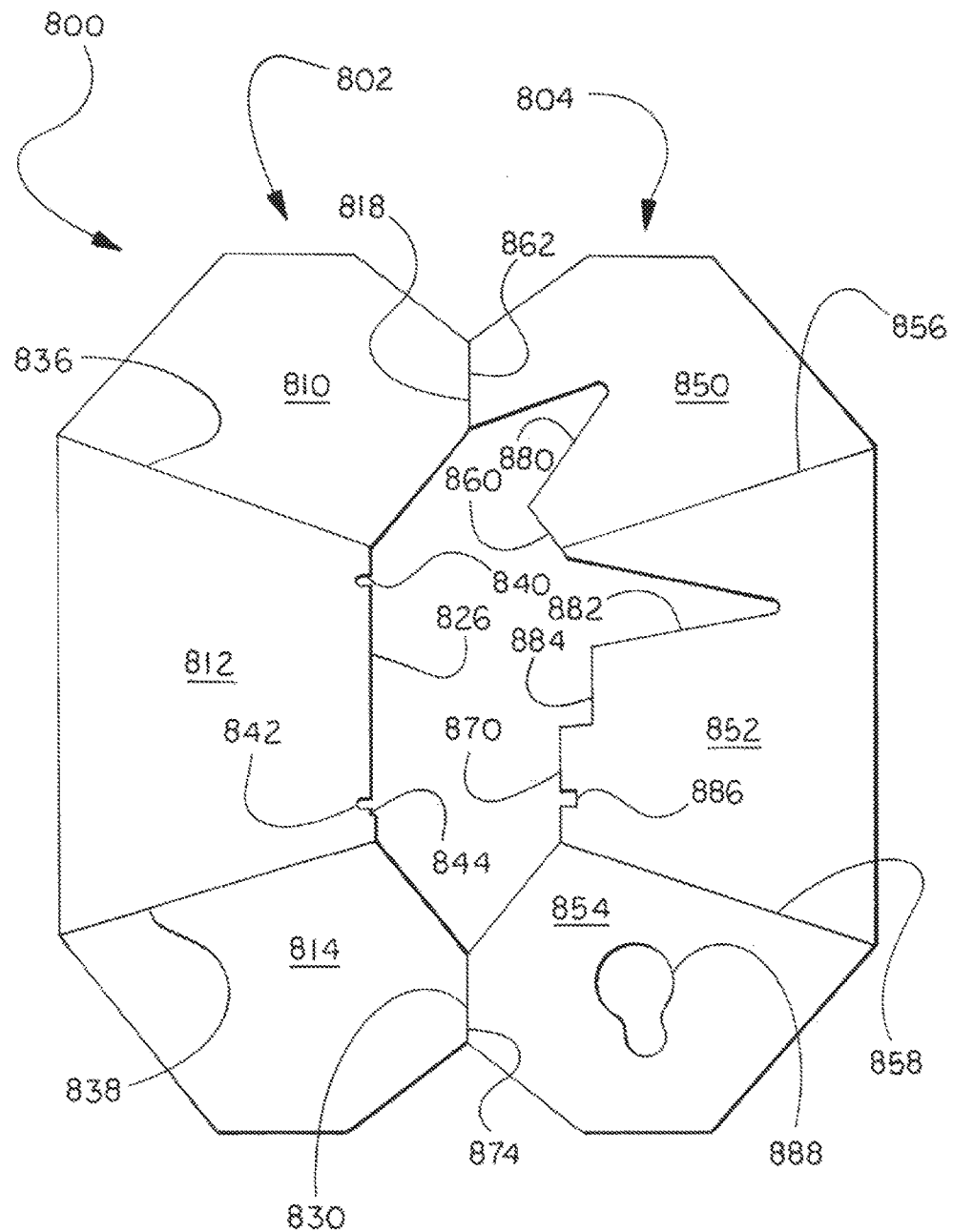

FIGS. 7 and 8 are top plan views of exemplary blanks 700 and 800 of secondary support assemblies. Unlike blanks 300, 400, 500, and 600, blanks 700 and 800 includes two sides coupled together rather than two separate sides. The sides may be coupled together using adhesive, fasteners, paper material, and/or another suitable component or material.

With reference now to FIG. 7, blank 700 includes a first member 702 and a second member 704. First member 702 has a first side panel 710, an interior panel 712, and a second side panel 714. First and second side panels 710, 714 extend from interior panel 712. First and second side panels 710, 714 are rotatable about fold lines 736 and 738, respectively. Second member 704 has a first side panel 750, an interior panel 752, and a second side panel 754. First and second side panels 750, 754 extend from interior panel 752. First and second side panels 750, 754 are rotatable about fold lines 756 and 758, respectively.

In the exemplary embodiment, an interior edge 726 of interior panel 712 includes cutouts 740, 742, and 744. Cutouts 740 and 742 have a similar parabolic shape. Cutout 744 is positioned adjacent to cutout 742 such that cutout 744 extends between cutout 742 and interior edge 726. On second member 704, first side panel 750 includes a cutout 780 on an interior edge 760. Interior panel 752 includes cutouts 782, 784, and 786 with different configurations spaced apart along an interior edge 770. Second side panel 754 includes an internal cutout 788.

First and second members 702, 704 are coupled together at first side panels 710 and 750 and second side panels 714 and 754. In particular, a side edge 718 of first side panel 710 is coupled to a side edge 762 of first side panel 750. A side edge 730 of second side panel 714 and a side edge of second side panel 754 are also coupled to each other. In other embodiments, members 702, 704 may be coupled in a different configuration, such as coupling at only one pair of edges.

Similarly, with reference to FIG. 8, blank 800 includes a first member 802 and a second member 804. First member 802 has a first side panel 810, an interior panel 812, and a second side panel 814. First and second side panels 810, 814 extend from interior panel 812. First and second side panels 810, 814 are rotatable about fold lines 836 and 838, respectively. Second member 804 has a first side panel 850, an interior panel 852, and a second side panel 854. First and second side panels 850, 854 extend from interior panel 852. First and second side panels 850, 854 are rotatable about fold lines 856 and 858, respectively.

In the exemplary embodiment, an interior edge 826 of interior panel 812 includes cutouts 840, 842, and 844. Cutouts 840 and 842 have a similar parabolic shape. Cutout 844 is positioned adjacent to cutout 842 such that cutout 844 extends between cutout 842 and interior edge 826. On second member 804, first side panel 850 includes a cutout 880 on an interior edge 860. Interior panel 852 includes cutouts 882, 884, and 886 with different configurations spaced apart along an interior edge 870. Second side panel 854 includes an internal cutout 888.

First and second members 802, 804 are coupled together at first side panels 810 and 850 and second side panels 814 and 854. In particular, a side edge 818 of first side panel 810 is coupled to a side edge 862 of first side panel 850. A side edge 830 of second side panel 814 and a side edge of second side panel 854 are also coupled to each other.

Although FIGS. 3-8 depicts exemplary blanks for secondary support assemblies, different sizes, shapes, and other configurations including those not illustrated herein may be used to form the blanks for secondary support assemblies. In some embodiments, the secondary support assembly used with base assembly 1000 may be customized for specific items or internal components.

Figure 9:
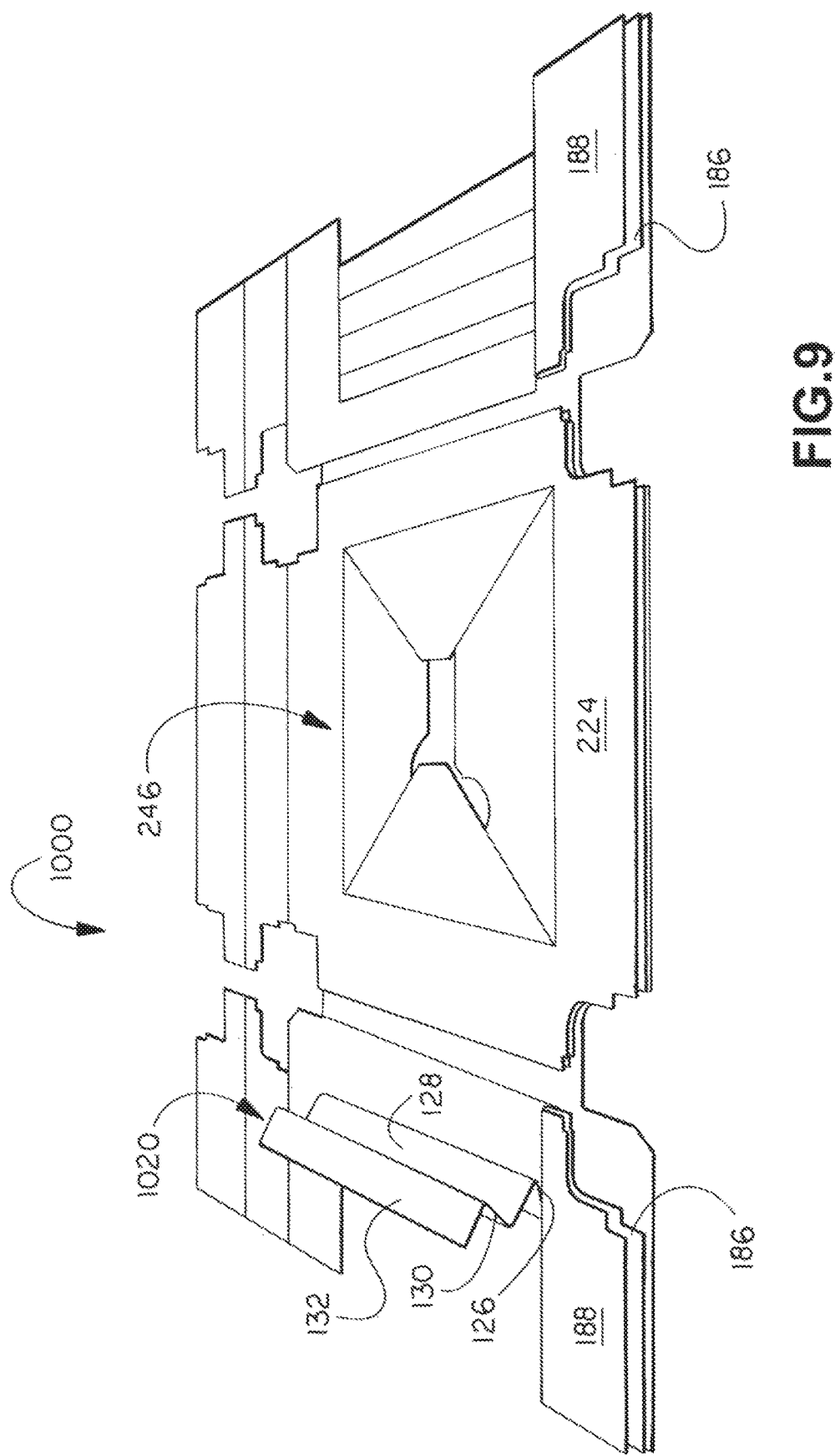
Figure 10:
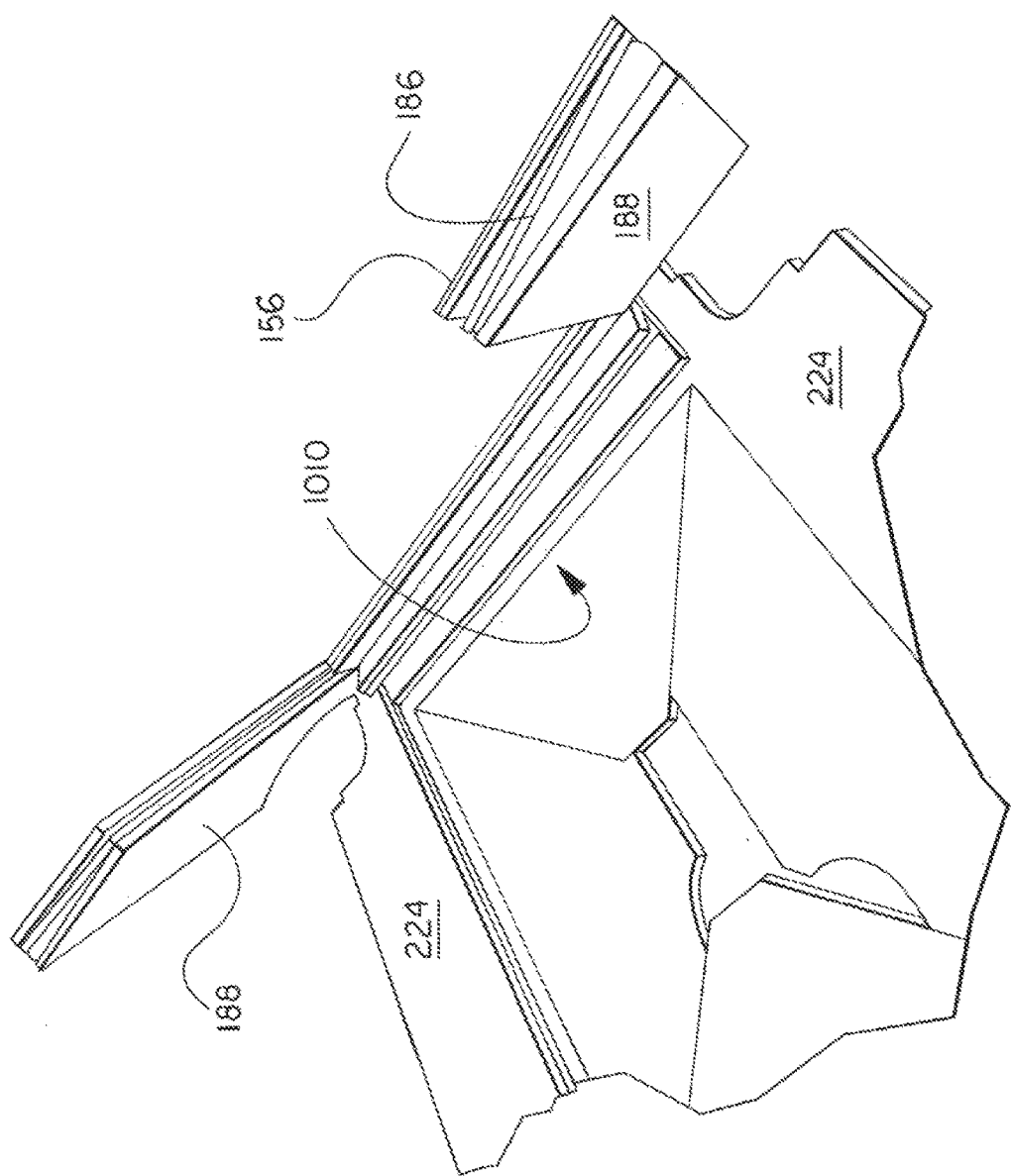
Figure 11:
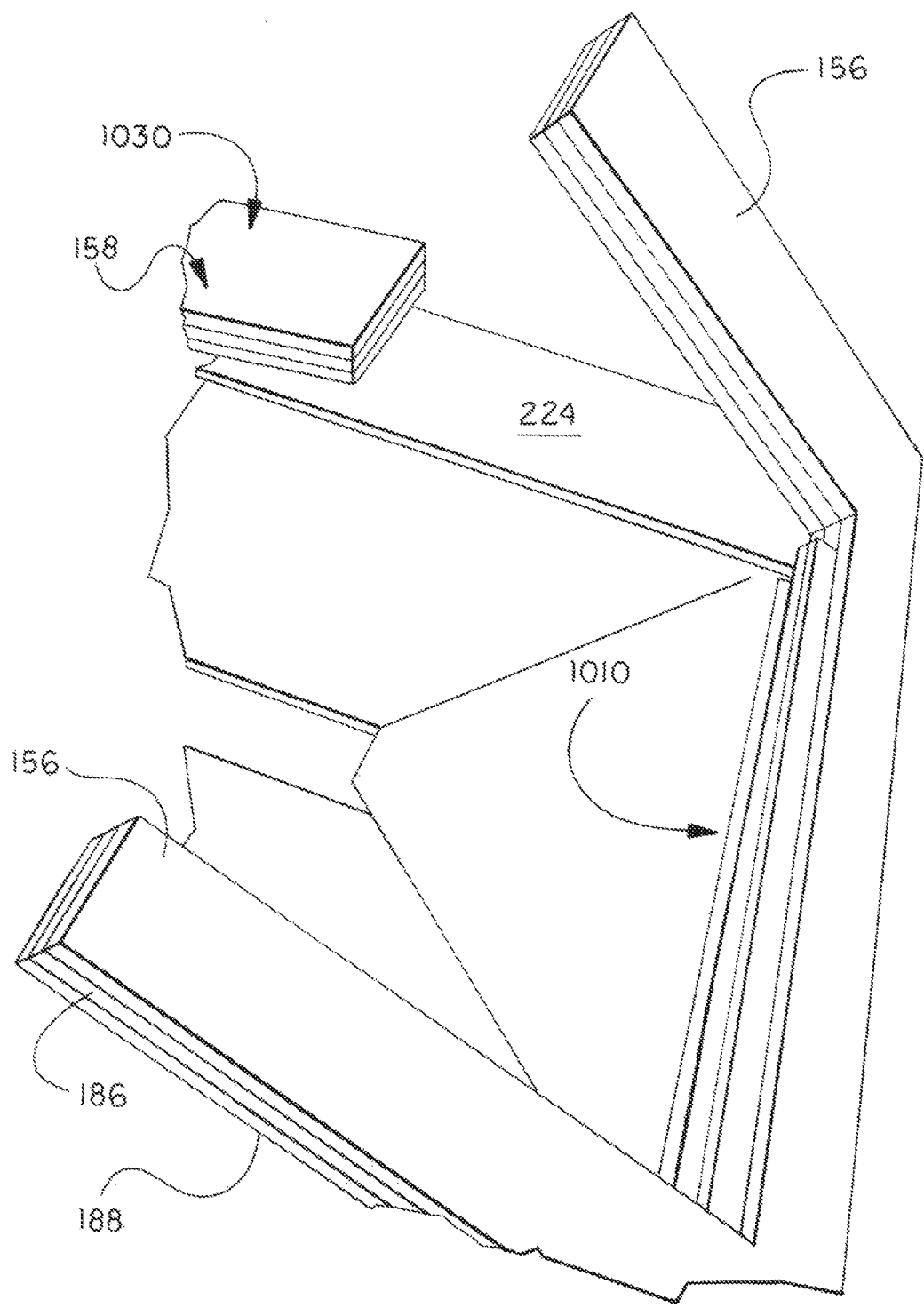
Figure 12:
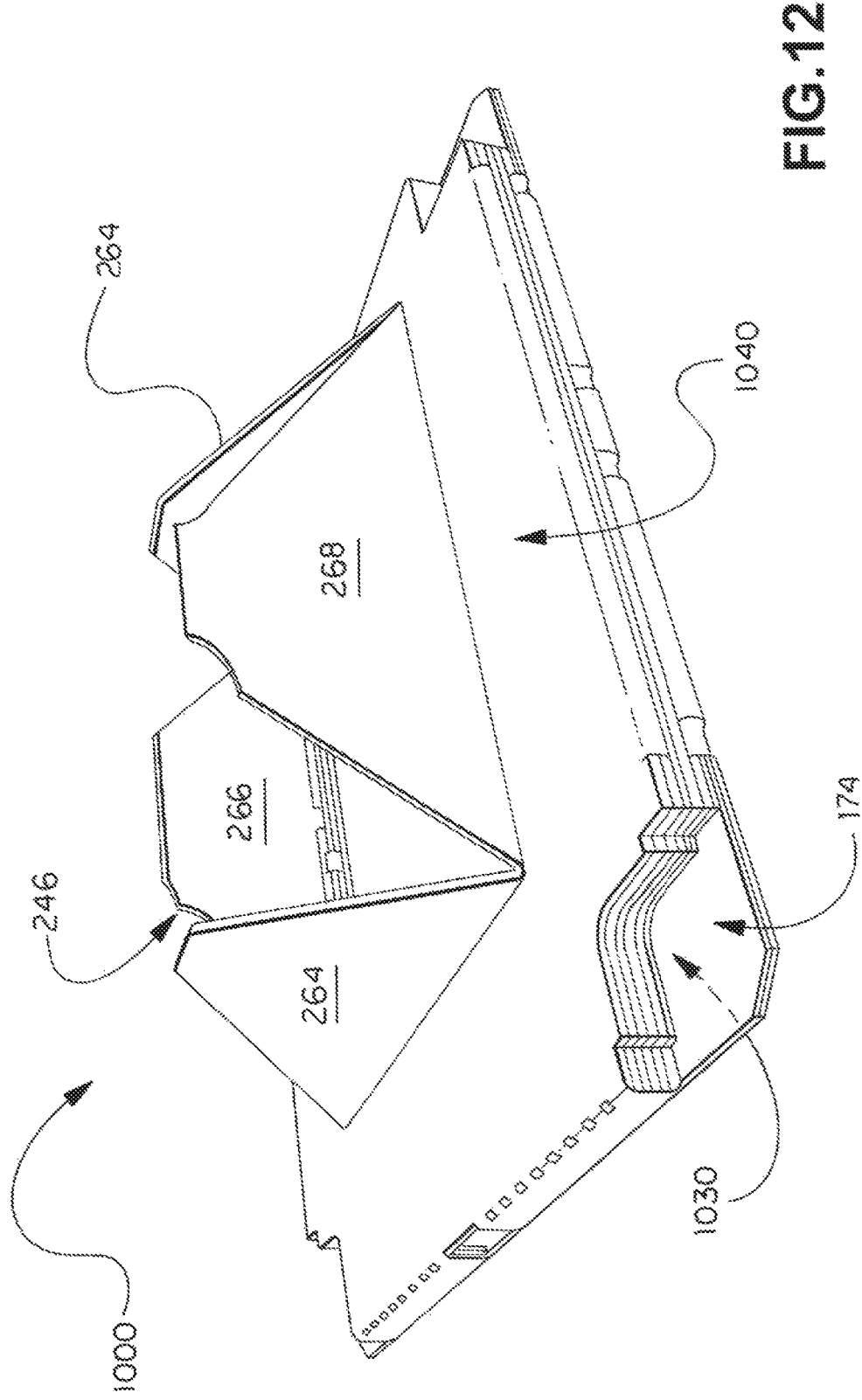
Figure 13:
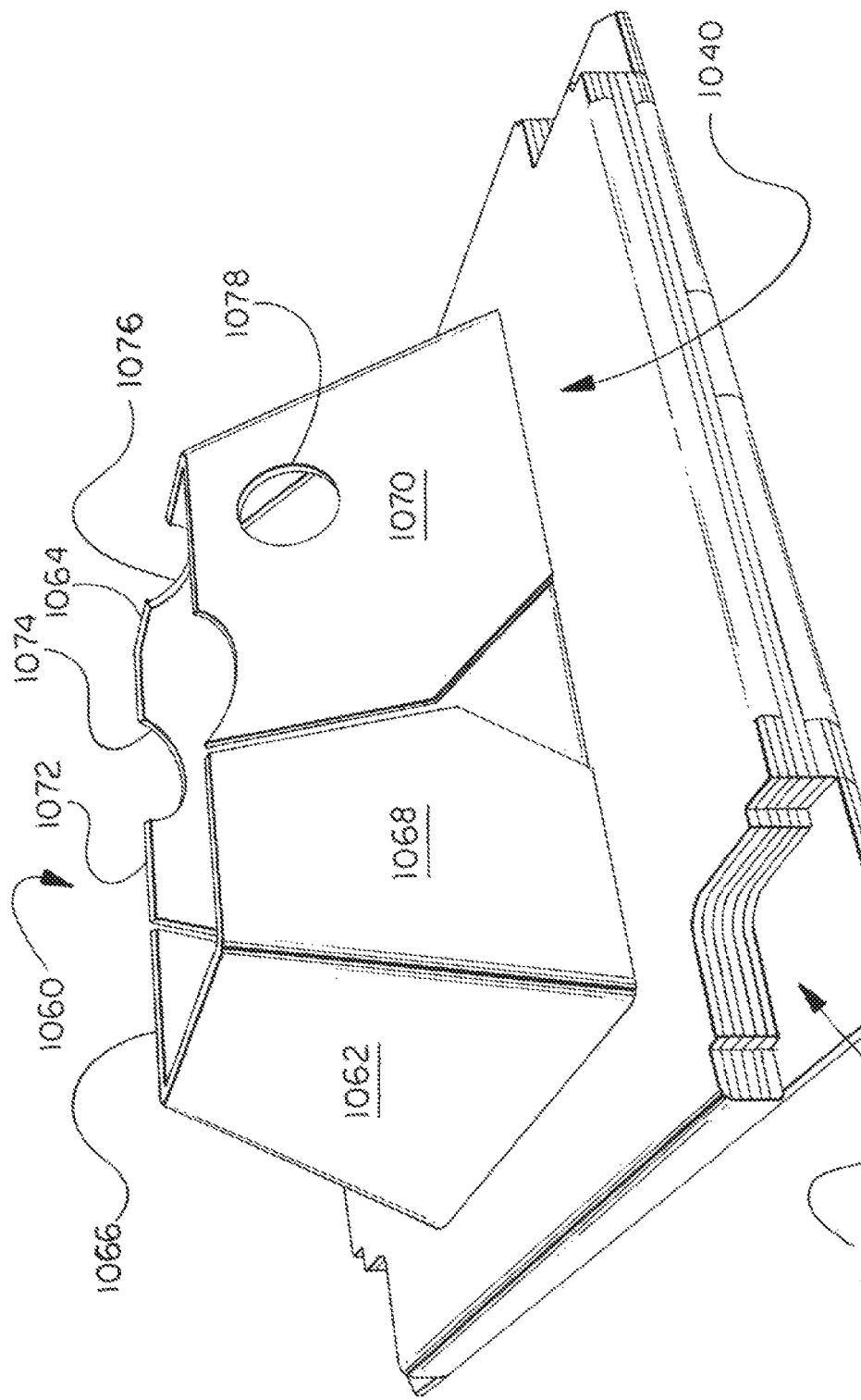
Figure 14:
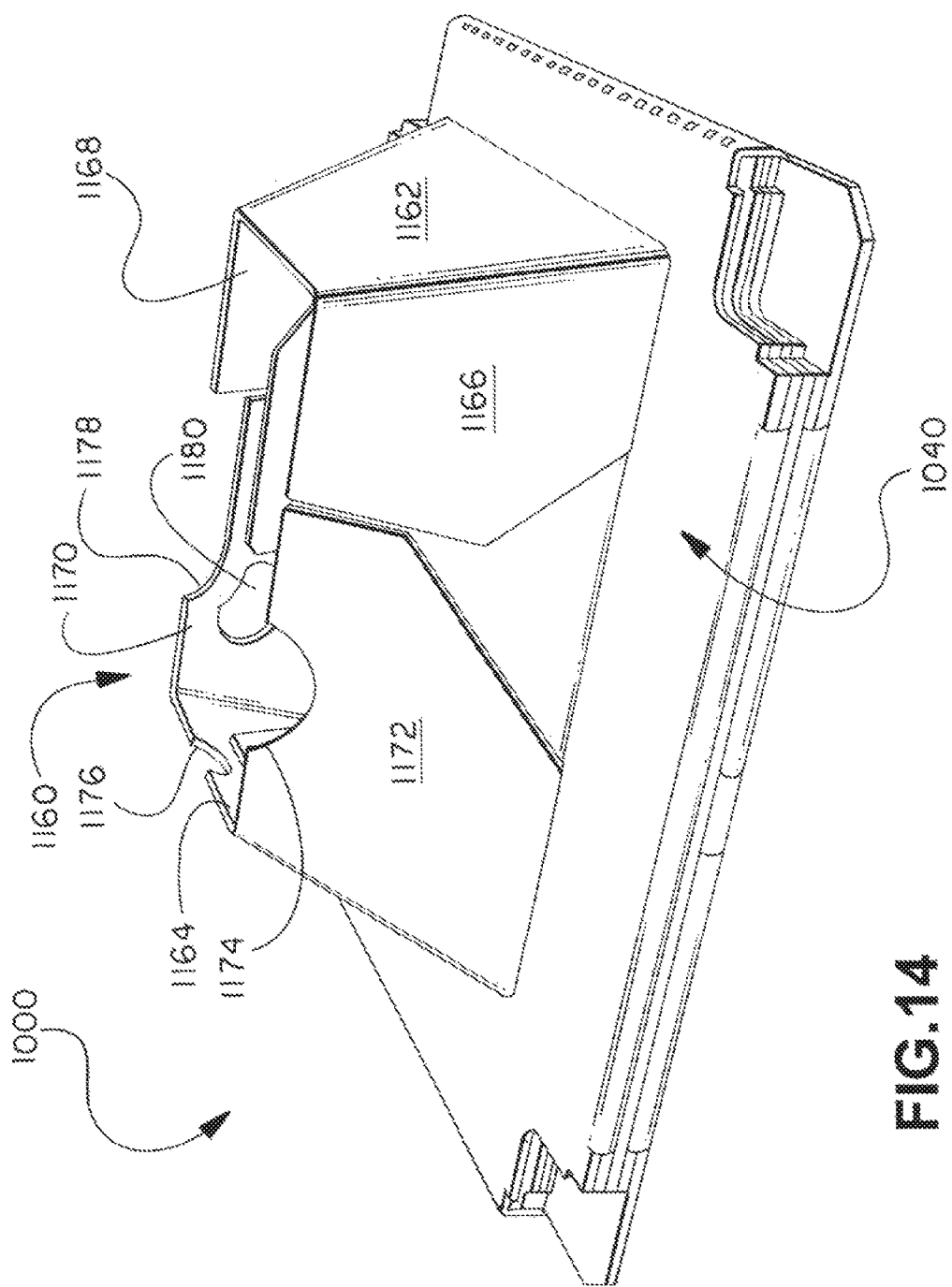

FIGS. 9-14 depict various views of base assembly 1000 in various stages of formation. More particularly, FIG. 9 is a perspective view of a partially formed base assembly 1000 during rotation of the reinforcing panels, FIG. 10 is another perspective view of a partially formed base assembly 1000 during rotation of the reinforcing panels, and FIG. 11 is another perspective view of a partially formed base assembly 1000 during rotation of an end panel. FIG. 12 is a perspective view of base assembly 1000 with a support structure in a shipping configuration. FIGS. 13 and 14 are perspective views of base assembly 1000 with exemplary secondary support assemblies. In the exemplary embodiment, blank 100 (shown in FIG. 1) is positioned with bottom surface 104 facing upwards to begin forming base assembly 1000. Reference numerals in the "100s" reference elements of blank 100, whereas reference numerals in the "1000s" reference elements of base assembly 1000.

To construct base assembly 1000 from blank 100, reinforcing panels 112, 114, 116, 118 are rotated or folded along fold lines 132, 134, 136, and 138 towards base panel 164 in an accordion style to form a vertical stack. More specifically, reinforcing panels 112, 114, 116, 118 are rotated substantially parallel to each other and engage each adjacent reinforcing panel in a face-to-face relationship. Similarly, reinforcing panels 122, 124, 126, 128 are rotated along fold lines 148, 150, 152, and 154 in an accordion style to form another vertical stack. In the exemplary embodiment, the reinforcing panels are rotated inwardly by alternating a direction of rotation for consecutive reinforcing panels. For example, reinforcing panel 112 is rotated about fold line 132 towards top surface 102, reinforcing panel 114 is rotated about fold line 134 towards bottom surface 104, reinforcing panel 116 is rotated about fold line 136 towards top surface 102, and reinforcing panel 118 is rotated about fold line 138 towards bottom surface 104 (all shown in FIG. 1) and form a vertical stack of reinforcing panels.

The partially-formed base assemblies 1000 shown in FIGS. 9 and 10 include two partially-formed stacks 1010 and 1020 of reinforcing panels. In at least some embodiments, adhesive or another fastener may be used to secure the reinforcing panels of stacks 1010, 1020 together or to first end panel 156, second end panel 158, and/or base panel 164. Stacks 1010, 1020 may facilitate distribution of forces applied to an upper surface of base assembly 1000 to a bottom surface of base assembly 1000 in addition to preventing base assembly 1000 from bending, crushing, or otherwise deforming in response to a force applied to a side surface of base assembly 1000. More specifically, stacks 1010, 1020 engage and reinforce first end panel 156, second end panel 158, outer side panel assemblies 182, and/or central side panel assemblies 218 to prevent the engaged panel from bending, crushing, or otherwise deforming.

Outer side panel assemblies 182 are rotated inwardly about fold lines 184 towards bottom surface 104 of first end panel 156 and second end panel 158. First outer side panel 186 and second outer side panel 188 are stacked in a face-to-face relationship. In the exemplary embodiment, second outer side panel 188 is rotated inwardly towards top surface 102 while first outer side panel 186 is rotated inwardly towards bottom surface 104. Alternatively, outer side panels 186, 188 may be rotated in a different direction. For example, both outer side panels 186, 188 may be rotated towards bottom surface 104. Outer side panel assemblies 182 are secured (e.g., using adhesive) and engaged in a face-to-face relationship with end panels 156, 158. In the exemplary embodiment, first outer side panel 186 is engaged in a face-to-face relationship with end panels 156, 158.

Central side panel assemblies 218 are stacked or rotated inwardly towards bottom surface 104. More particularly, central side panel assemblies 218 are rotated about fold lines 220 to engage bottom surface 104 of side members 262 in a face-to-face relationship. In such an embodiment, first central side panel 222 is engaged with side members 262 in a face-to-face relationship. Second central side panel 224 is rotated about fold line 226 towards top surface 102 to engage first central side panel 222 in a face-to-face relationship and form a stack. That is, first central side panel 222 is positioned between second central side panel 224 and side member 262 of base panel 164. Alternatively, central side panel assemblies 218 may be rotated in a different configuration.

Once outer side panel assemblies 182 and central side panel assemblies 218 have been rotated, first end panel 156 and first fold panel 160 are rotated inwardly about fold lines 140 and 142, respectively, towards bottom surface 104 of base panel 164 as shown in FIG. 11. More specifically, after rotation, first end panel 156 is substantially parallel and vertically offset a distance from base panel 164 and first fold panel 160 is perpendicular to base panel 164 and first end panel 156. Stack 1020 is positioned between first end panel 156 and end member 260 after rotation proximate to inner edge 248. In the exemplary embodiment, stack 1020 has a height substantially the same as a length $L_5$ (shown in FIG. 1) of first fold panel 160. In the exemplary embodiment, length $L_5$ at least partially defines a vertical offset between end member 260 and first end panel 156 or second end panel 158. Second end panel 158 and second fold panel 162 are rotated about fold lines 146 and 144, respectively, towards bottom surface 104. Similar to first end panel 156, second end panel 158 is substantially parallel and vertically offset a distance from end member 260 after rotation. Second fold panel 162 is perpendicular to second end panel 158 and base panel 164 after rotation. In the exemplary embodiment, the stacked outer side panel assemblies 182 and central side panel assemblies 218 are engaged in a face-to-face relationship. In one embodiment, leading edge 106 and trailing edge 108 of outer side panel assemblies 182 are substantially adjacent to each other when first end panel 156 and second end panel 158 are rotated. In another embodiment, first end panel 156 and second end panel 158 may be overlapped. Alternatively, leading edge 106 and trailing edge 108 may be separated by a gap (not shown) along a length of central side panel assemblies 218.

When first end panel 156 and second end panel 158 have been rotated and secured (e.g., via adhesive or another coupling method or material), base assembly 1000 is flipped such that first end panel 156 and second end panel 158 form a bottom or base surface 1030 of base assembly 1000. Corner pad sections 174 extend outwardly beyond end panels 156, 158 and base panel 164. In some embodiments, the exposed corner pad sections 174 may be configured to support a portion of the internal components of an item being shipped, such as a leg or frame. Support structure 246 is adjusted from a flat configuration (shown in FIG. 9) to a shipping configuration (shown in FIG. 12). Base assembly 1000 may be configured to facilitate unimpeded access to support structure 246 from top surface 102 and bottom surface 104. For example, a mandrel may be extended upwardly through bottom surface 104 of support structure 246 to adjust support structure 246 to the shipping configuration. In the exemplary embodiment, end support panels 264 and side support panels 266, 268 are rotated outwardly around fold lines 250, 252, 254, and 256. In some embodiments, end support panels 264, and side support panels 266, 268 may abut each other or otherwise support each other to bias support structure 246 in the shipping configuration. In the exemplary embodiment, support structure 246 is angled inwardly after rotation. In other embodiments, support structure 246 may be at a different angle or orientation, such as a vertical orientation.

Base assembly 1000 has a load surface 1040 that supports a load or item positioned on base assembly 1000 during shipment of the item. In the exemplary embodiment, load surface 1040 is top surface 102 of base panel 164. In at least some embodiments, load surface 1040 may be fabricated to bend or flex to facilitate increased distribution of forces applied to base assembly 1000 by the item (e.g., vibration, impact forces) and to facilitate prevention of damage to the item. In one example, load surface 1040 supports a frame or exterior of the item and support structure 246 extends within an interior of the item. Forces applied to load surface 1040 may be distributed through at least stacks 1010, 1020 to bottom surface 1030.

With reference now to FIG. 13, in the exemplary embodiment, a secondary support assembly 1060 is coupled to support structure 246 to bias end support panels 264 and side support panels 266, 268 in the shipping configuration. Secondary support assembly 1060 may be coupled to support structure 246 and/or base panel 164 using a suitable coupling method or material such as adhesive. In the exemplary embodiment, secondary support assembly 1060 has a pair of opposed interior panels 1062 and 1064 that are coupled to end support panels 264. Each side of secondary support assembly 1060 includes a pair of side panels 1066, 1068, 1070, and 1072 that extend from interior panels 1062 and 1064 and couple to side support panels 266, 268. In some embodiments, secondary support assembly 1060 may be in an edge-to-face relationship with load surface 1040.

Secondary support assembly 1060 includes cutouts 1074, 1076, and 1078. Cutouts 1074, 1076, and 1078 are formed to engage and secure a portion of the item positioned on base assembly 1000. In particular, cutouts 1074, 1076, 1078 are formed to engage and secure one or more internal components of the item (e.g., a motor). In other embodiments, secondary support assembly 1060 may include a different number, shape, and/or size of cutouts or other features to support the internal components. Secondary support assembly 1060 is configured to secure the internal components during transportation to inhibit movement of the internal components. In at least some embodiments, secondary support assembly 1060 may be fabricated from a material with increased rigidity in comparison to blank 100.

With reference now to FIG. 14, base assembly 1000 may include another exemplary secondary support assembly 1160. Secondary support assembly 1160 is similar to secondary support assembly 1060 and, in the absence of contrary representation, provides a similar functionality to base assembly 1000.

Secondary support assembly 1160 is coupled to support structure 246 to bias end support panels 264 and side panels 266, 268 in the shipping configuration. In the exemplary embodiment, secondary support assembly 1160 has a pair of opposed interior panels 1162 and 1164 that are coupled to end support panels 264. Each side of secondary support assembly 1160 includes a pair of side panels 1166, 1168, 1170, and 1172 that extend from interior panels 1162 and 1164 and couple to side support panels 266, 268. In some embodiments, secondary support assembly 1160 may be in an edge-to-face communication with load surface 1040. Secondary support assembly 1160 also includes cutouts 1174, 1176, 1178, and 1180. Cutouts 1174, 1176, 1178, and 1180 are formed to engage and secure one or more internal components of the item. In some embodiments, cutouts 1174, 1176, 1178, and 1180 are fabricated to engage specific internal components of the item.

The embodiments described above provide a base assembly that includes a plurality of reinforcing panels to provide support to an item positioned on the base assembly during shipment of the item. The reinforcing panels enable the base assembly to bear a weight of the item and to maintain its form when other forces are applied to the base assembly (such as during transportation). More specifically, the reinforcing panels distribute forces through the base assembly to prevent damage to the base assembly and the item.

Further, the above-described embodiments provide a base assembly with a support structure and a secondary support assembly that provide better support for items with internal components during transportation as compared to at least some known support structures. More specifically, the support structure and the secondary support assembly extend within or towards the item to engage and secure one or more internal components of the item to inhibit movement of the internal components relative to the item to prevent damage. The support structure and the secondary support assembly may also distribute forces induced on the internal components through the base assembly. The support structure and/or the secondary support assembly may include cutouts or other features that are customized to engage specific internal components of the item to improve support provided by the base assembly.

Exemplary embodiments of blanks and methods for forming base assemblies are described above in detail. The apparatus and methods are not limited to the specific embodiments described herein, but rather, components of apparatus and/or steps of the methods may be utilized independently and separately from other components and/or steps described herein. For example, the methods may also be used in combination with other containers and methods, and are not limited to practice with only the containers and methods as described herein. Rather, the exemplary embodiment can be implemented and utilized in connection with many other container applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A base assembly for supporting an item having internal components during shipment of the item, the base assembly comprising:

a base panel comprising two opposing end members, two opposing side members, and a plurality of support panels, each end member and side member having an inner edge and an outer edge, each support panel of the plurality of support panels extending upwardly from one of the inner edges of the end members and the side members; and two opposing end panel assemblies extending from the outer edges of the end members, each end panel assembly comprising an end panel and a plurality of reinforcing panels, each end panel vertically spaced a distance from an adjacent end member of the two opposing end members, and wherein the plurality of reinforcing panels are positioned between the respective end panel and the adjacent end member;

further comprising at least one secondary support assembly, wherein the at least one secondary support assembly includes a plurality of secondary support panels comprising at least a first secondary support panel and a second secondary support panel extending from said first secondary support panel along a first fold line, wherein each of the first secondary support panel and the second secondary support panel is coupled in face-to-face relationship to a different one of a selected two support panels of said plurality of support panels.

2. The base assembly in accordance with claim 1, wherein the plurality of reinforcing panels are positioned in a face-to-face relationship forming a vertical stack, the vertical stack positioned between the respective end panel and the adjacent end member.

3. The base assembly in accordance with claim 1, wherein at least one of the plurality of secondary support panels includes a cutout.

4. The base assembly in accordance with claim 1, wherein the at least one secondary support assembly comprises a first secondary support assembly and an opposing second secondary support assembly, wherein the first secondary support assembly is coupled to at least the selected two support panels of the plurality of support panels, and the second secondary support assembly is coupled to at least two other support panels of the plurality of support panels.

5. The base assembly in accordance with claim 1 further comprising a fold panel extending downwardly between one of the end members of the two opposing end members and an adjacent end panel of the two end panels, wherein the end panels and the plurality of reinforcing panels are positioned below the base panel.

6. The base assembly in accordance with claim 1, wherein each of the end panel assemblies further comprises two opposing outer side panel assemblies, each outer side panel assembly extending from a side edge of a respective end panel of the two end panels, the outer side panel assemblies positioned between one of the end panels of the two end panels and one of the side members of the base panel.

7. The base assembly in accordance with claim 6, wherein each of the outer side panel assemblies comprises first and second outer side panels, the first and second outer side panels stacked in a face-to-face relationship, the stack of first and second outer side panels positioned between one of the end panels of the two end panels and one of the side members of the base panel.

8. The base assembly in accordance with claim 6, wherein the base panel further comprises two opposing central side panel assemblies extending from the outer edges of the side members, each of the two central side panel assemblies comprising first and second central side panels stacked in a face-to-face relationship, the stack of first and second central side panels positioned between one of the end panels of the two end panels and one of the side members of the base panel.

9. The base assembly in accordance with claim 1, wherein the plurality of reinforcing panels for each end panel assembly includes at least three reinforcing panels folded in a face-to-face relationship using accordion style folds to form a vertical stack, each vertical stack of the reinforcing panels positioned below one of the end members and proximate to one of the inner edges of the same one end member.

10. The base assembly in accordance with claim 1, wherein each end panel of the two opposing end panel assemblies further comprises two opposing corner pad sections, each corner pad section projecting outwardly beyond a corresponding corner edge of the base panel, each corner pad section configured to receive a portion of the item being shipped.

11. The base assembly in accordance with claim 10, wherein the base panel further comprises a hole, the hole extending downwardly to one of the two opposing end panel assemblies when the base assembly is formed, wherein the hole is configured to receive a leg of the item being shipped.

12. A blank assembly for forming a base assembly for supporting an item having internal components during shipment of the item, the blank assembly comprising:
a first blank of sheet material comprising;
a base panel comprising two opposing end members, two opposing side members, and a plurality of support panels, each end member and side member having an inner edge and an outer edge, said plurality of support panels configured to extend upwardly from one of the inner edges of the end members and the side members; and
two opposing end panel assemblies extending from the outer edges of the end members, each end panel assembly comprising an end panel and a plurality of reinforcing panels, wherein each end panel vertically spaced a distance from an adjacent end member of the two opposing end members and the plurality of reinforcing panels are positioned between the respective end panel and the adjacent end member when the base assembly is formed; and
a second blank of sheet material comprising at least one secondary support assembly, wherein the at least one secondary support assembly includes a plurality of secondary support panels comprising at least a first secondary support panel and a second secondary support panel extending from said first secondary support panel along a first fold line, wherein each of the first secondary support panel and the second secondary support panel are configured to be coupled in face-to-face relationship to a different one of a selected two support panels of said plurality of support panels.

13. The blank assembly in accordance with claim 12, wherein the plurality of reinforcing panels are positioned in a face-to-face relationship forming a vertical stack, the vertical stack positioned between the respective end panel and the adjacent end member when the base assembly is formed.

14. The blank assembly in accordance with claim 12, wherein the at least one secondary support assembly includes a plurality of secondary support panels, and wherein at least one of the plurality of secondary support panels includes a cutout.

15. The blank assembly in accordance with claim 12, further comprising a third blank; wherein the at least one secondary support assembly comprises a first secondary support assembly and wherein the third blank comprises an opposing second secondary support assembly, wherein the first secondary support assembly is configured to couple to at least the selected two support panels of the plurality of support panels, and the second secondary support assembly is configured to couple to at least two other support panels of the plurality of support panels when the base assembly is formed.

16. The blank assembly in accordance with claim 12 further comprising a fold panel extending between one of the end members of the two opposing end members and an adjacent end panel of the two end panels, wherein the fold panel extends downwardly from the end member when the base assembly is formed, and wherein the end panels and the plurality of reinforcing panels are positioned below the base panel.

17. The blank assembly in accordance with claim 12, wherein each of the end panel assemblies further comprises two opposing outer side panel assemblies, each outer side panel assembly extending from a side edge of a respective end panel of the two end panels, wherein the outer side panel assemblies is positioned between one of the end panels of the two end panels and one of the side members of the base panel when the base assembly is formed.

18. The blank assembly in accordance with claim 17, wherein each of the outer side panel assemblies comprises first and second outer side panels, the first and second outer side panels configured to be stacked in a face-to-face relationship when the base assembly is formed, the stack of first and second outer side panels positioned between one of the end panels of the two end panels and one of the side members of the base panel.

19. The blank assembly in accordance with claim 17, wherein the base panel further comprises two opposing central side panel assemblies extending from the outer edges of the side members, each of the two central side panel assemblies comprising first and second central side panels stacked in a face-to-face relationship, the stack of first and second central side panels positioned between one of the end panels of the two end panels and one of the side members of the base panel.

20. The blank assembly in accordance with claim 12, wherein the plurality of reinforcing panels for each end panel assembly includes at least three reinforcing panels configured to be folded in a face-to-face relationship using accordion style folds to form a vertical stack when the base assembly is formed, each vertical stack of the reinforcing panels positioned below one of the end members and proximate to one of the inner edges of the same one end member.

21. The blank assembly in accordance with claim 12, wherein each end panel of the two opposing end panel assemblies further comprises two opposing corner pad sections, each corner pad section projecting outwardly beyond a corresponding corner edge of the base panel when the base assembly is formed, each corner pad section configured to receive a portion of the item being shipped.

22. The blank assembly in accordance with claim 21, wherein the base panel further comprises a hole that extends downwardly to one of the two opposing end panel assemblies when the base assembly is formed, wherein the hole is configured to receive a leg of the item being shipped.

23. A method for forming a base assembly for supporting an item having internal components during shipment of the item from at least a first and second blank, the first blank comprising a base panel and two opposing end panel assemblies extending from the base panel, the base panel comprising two opposing end members, two opposing side members, and a plurality of support panels, each end member and side member having an inner edge and an outer edge, and each end panel assembly of the two opposing end panel assemblies comprising an end panel and a plurality of reinforcing panels, the second blank comprising a secondary support assembly comprising at least a first secondary support panel and a second secondary support panel extending from the first secondary support panel along a first fold line, the method comprising:

folding the plurality of reinforcing panels of the two end panel assemblies inwardly towards a bottom surface of an adjacent end member of the two opposing end members using accordion style folds to form a vertical stack;

folding the end panels of the two end panel assemblies inwardly towards a bottom surface of the adjacent end member, wherein each end panel is vertically spaced a distance from the adjacent end member and the vertical stack is positioned between the end panel and the adjacent end member; and extending the plurality of support panels upwardly from one of the inner edges of the end members and the side members, the plurality of support panels configured to support at least one of the internal components of the item being shipped;

coupling each of said first secondary support panel and said second secondary support panel in face-to-face relationship to a different one of a selected two of said plurality of support panels.

24. The method in accordance with claim 23, wherein each of the two end panel assemblies further comprises two opposing outer side panel assemblies, each outer side panel assembly extending from a side edge of the end panel, wherein folding the end panels of the two end panel assemblies inwardly further comprises folding the two opposing outer side panel assemblies inwardly towards a bottom surface of the end panel, the two outer side panel assemblies positioned between the end panel and an adjacent side member of the two side members.

25. The method in accordance with claim 24, wherein the base panel further comprises two opposing central side panel assemblies, each central side panel assembly extending from the outer edge of a respective side member of the two side members, wherein folding the end panels of the two end panel assemblies inwardly further comprises folding the two opposing central side panel assemblies inwardly towards a bottom surface of the base panel, the two central side panel assemblies positioned between the two outer side panel assemblies and the two side members.

* * * * *